(12) United States Patent
Desai et al.

(10) Patent No.: US 10,550,014 B2
(45) Date of Patent: Feb. 4, 2020

(54) ELECTROCHEMICAL DESALINATION SYSTEM WITH COUPLED ELECTRICITY STORAGE

(71) Applicant: Palo Alto Research Center Incorporated, Palo Alto, CA (US)

(72) Inventors: Divyaraj Desai, Sunnyvale, CA (US); Eugene S. Beh, Portola Valley, CA (US); Armin R. Volkel, Mountain View, CA (US); Quentin L. C. Van Overmeere, Mountain View, CA (US); Jessica Louis Baker Rivest, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 51 days.

(21) Appl. No.: 15/972,930

(22) Filed: May 7, 2018

(65) Prior Publication Data
US 2019/0047880 A1 Feb. 14, 2019

Related U.S. Application Data

(60) Provisional application No. 62/544,199, filed on Aug. 11, 2017.

(51) Int. Cl.
*C02F 1/46* (2006.01)
*C02F 1/461* (2006.01)
(Continued)

(52) U.S. Cl.
CPC ........ *C02F 1/4604* (2013.01); *C02F 1/46109* (2013.01); *H01M 4/368* (2013.01);
(Continued)

(58) Field of Classification Search
CPC .... C02F 1/4604; C02F 1/46109; C02F 1/441; C02F 2103/08; H01M 8/188
See application file for complete search history.

(56) References Cited

U.S. PATENT DOCUMENTS 8,801,910 B2 * 8/2014 Bazant ................ B01D 61/425
204/536
8,999,132 B2 * 4/2015 Bazant ................ B01D 61/425
204/632

(Continued)

OTHER PUBLICATIONS

Al-Karaghouli, et al., "Energy consumption and water production cost of conventional and renewable-energy-powered desalination processes", Renew. Sustainable Energy Rev. 2013, 24, 343-356.

(Continued)

*Primary Examiner* — Stewart A Fraser
(74) *Attorney, Agent, or Firm* — Mueting, Raasch & Gebhardt, P.A.

(57) ABSTRACT

A desalination and energy storage system comprises at least one water reservoir, at least one negative-ion redox electrode, at least one positive-ion redox electrode, a cation-exchange membrane disposed between the at least one negative-ion redox electrode and the water reservoir, and an anion-exchange membrane disposed between the at least one positive-ion redox electrode and the water reservoir. The at least one water reservoir comprises an input and an output, wherein water in the at least one water reservoir is reduced below a threshold concentration during a desalination operation mode. The at least one negative-ion electrode comprises a first solution and is configured to accept, and have, a reversible redox reaction with at least one negative ion in the water, and the at least one positive-ion electrode comprises a second solution and is configured to accept, and have, a reversible redox reaction with at least one positive ion in the water.

20 Claims, 16 Drawing Sheets

(51) Int. Cl.
| | |
|---|---|
| H01M 8/18 | (2006.01) |
| H01M 4/42 | (2006.01) |
| H01M 4/58 | (2010.01) |
| H01M 4/36 | (2006.01) |
| C02F 1/44 | (2006.01) |
| C02F 103/08 | (2006.01) |
| C02F 101/12 | (2006.01) |

(52) U.S. Cl.
CPC .............. *H01M 4/42* (2013.01); *H01M 4/58* (2013.01); *H01M 8/188* (2013.01); *C02F 1/441* (2013.01); *C02F 2001/46133* (2013.01); *C02F 2101/12* (2013.01); *C02F 2103/08* (2013.01); *C02F 2201/4618* (2013.01); *C02F 2201/46115* (2013.01)

(56) References Cited

U.S. PATENT DOCUMENTS

| | | | |
|---|---|---|---|
| 9,340,436 B2 | 5/2016 | Sahu et al. | |
| 9,640,826 B2 | 5/2017 | Yan et al. | |
| 9,670,077 B2 | 6/2017 | Volkel et al. | |
| 9,673,472 B2 | 6/2017 | Volkel et al. | |
| 2004/0055955 A1* | 3/2004 | Davis | B01D 61/44 210/652 |
| 2015/0232348 A1* | 8/2015 | Jepson | C02F 1/008 203/11 |

OTHER PUBLICATIONS

Anderson et al., "Capacitive deionization as an electrochemical means of saving energy and delivering clean water. Comparison to present desalination practices: Will it compete?", Electrochim. Acta 2010, 55 (12), 3845-3856.
Arellano et al., "Effects of pH on the degradation of aqueous ferricyanide by photolysis and photocatalysis under solar radiation", Solar Energy Mater. Solar Cells 2010, 94 (2), 327-332.
Bajpayee et al., "Very low temperature membrane-free desalination by directional solvent extraction", Energy Environ. Sci. 2011, 4 (5), 1672.
Beh et al., "A neutral pH aqueous organic—organometallic redox flow battery with extremely high capacity Retention", ACS Energy Lett. 2017, 2 (3), 639-644.
Dai, "Increasing drought under global warming in observations and models", Nat. Clim.Change 2013, 3 (1), 52-58.
Darling et al., "Pathways to low-cost electrochemical energy storage: a comparison of aqueous and nonaqueous flow batteries", Energy Environ. Sci. 2014, 7 (11), 3459-3477.
Ferguson et al., "Studies on Overvoltage. IX: The Nature of Cathode and Anode Discharge Potentials at Several Metal Surfaces1,2", J. Phys. Chem. 1937, 42 (2), 171-190.
Gong et al., "A zinc-iron redox-flow battery under $100 per kW h of system capital cost", Energy Environ. Sci. 2015, 8 (10), 2941-2945.
Gowin, "Examining the economics of seawater desalination using the DEEP code", Nuclear Power Technology Development Section, I. A. E. A., Ed. Vienna, Austria, 2000.
Gu et al., "A multiple ion-exchange membrane design for redox flow batteries", Energy Environ. Sci. 2014, 7 (9), 2986.
John et al., "Seasonal cycles of temperature, salinity and water masses of the western Arabian gulf", Oceanol. Acta 1990, 13 (3), 273-281.
Khawaji et al., "Advances in seawater desalination technologies", Desalination 2008, 221 (1-3), 47-69.
Konopka et al., "Diffusion coefficients of ferri- and ferrocyanide ions in aqueous media, using twin-electrode thin-layer electrochemistry", Anal. Chem. 1970, 42 (14), 1741-1746.
La Mantia et al., "Batteries for efficient energy extraction from a water salinity difference", Nano Lett. 2011, 11 (4), 1810-3.
"Lazard's Levelized Cost of Storage—Version 2.0." 2016, 46 pages.
Lee et al., "Desalination of a thermal power plant wastewater by membrane capacitive deionization", Desalination 2006, 196 (1-3), 125-134.
Lee et al., "Rocking chair desalination battery based on Prussian blue electrodes", ACS Omega 2017, 2 (4), 1653-1659.
Loutatidou, et al., "Capital cost estimation of RO plants: GCC countries versus southern Europe", Desalination 2014, 347, 103-111.
Malhotra et al., "Use cases for stationary battery technologies: A review of the literature and existing projects", Renew. Sustainable Energy Rev. 2016, 56, 705-721.
McGovern et al., "On the cost of electrodialysis for the desalination of high salinity feeds", Appl. Energy 2014, 136, 649-661.
Nair et al., "Water desalination and challenges: The Middle East perspective: a review", Desalin. Water Treat. 2013, 51 (10-12), 2030-2040.
Oren, "Capacitive deionization (CDI) for desalination and water treatment—past, present and future (a review)", Desalination 2008, 228 (1-3), 10-29.
Pasta et al., "A desalination battery" Nano Lett.2012, 12 (2), 839-43.
Patil et al., "Diffusivity of some zinc and cobalt salts in water", J. Chem. Eng. Data 1993, 38 (4), 574-576.
Sadrzadeh et al., "Sea water desalination using electrodialysis", Desalination 2008, 221 (1), 440-447.
Seto et al., "Seawater desalination by electrodialysis", Desalination 1978, 25 (1), 1-7.
Soloveichik, "Flow batteries: current status and trends", Chem. Rev. 2015, 115 (20), 11533-58.
Stillwell et al., "Predicting the specific energy consumption of reverse osmosis desalination", Water 2016, 8 (12).
Viswanathan et al., "Cost and performance model for redox flow batteries", J. Power Sources 2014, 247, 1040-1051.
"Desalination in the GCC: The History, the Present & the Future", Desalination Experts Group, Water Resources Committee, General Secretariat of the GCC: 2014.
Ye et al., "Performance of a mixing entropy battery alternately flushed with wastewater effluent and seawater for recovery of salinity gradient energy", Energy Environ. Sci. 2014, 7 (7), 2295-2300.

* cited by examiner

ELECTROCHEMICAL DESALINATION SYSTEM WITH COUPLED ELECTRICITY STORAGE

RELATED APPLICATIONS

This application claims the benefit of U.S. provisional patent application Ser. No. 62/544,199, filed on Aug. 11, 2017, to which priority is claimed pursuant to 35 U.S.C. § 119(e), and which is incorporated herein by reference in its entirety.

TECHNICAL FIELD

This disclosure relates generally to energy storage systems employing a reversible desalination-salination process, methods of operating the same, and an electrochemical battery for use in the systems.

BACKGROUND

Climate change is projected to result in severe and widespread droughts within the next 30-90 years. Water scarcity is expected to affect 48% of the global population by 2025, and result in depletion of 90% of available freshwater sources. This projected demand for freshwater requires the development and adoption of increasingly energy-efficient and affordable desalination technologies, which are currently energy intensive. Seawater desalination processes require thermal, hydraulic, or electrical energy to separate feed water, typically 35 ppt (parts per thousand) total dissolved solids (TDS) into desalinated water (TDS<0.5 ppt) and brine. The current state-of-the-art in desalination, seawater reverse osmosis (SWRO), requires large capital investments and incurs high operating costs, resulting in water that is expensive (>$0.53 m$^{-3}$) to produce. Furthermore, the specific energy consumption and desalination cost escalates with increasing feed salinity due to increased osmotic pressure. SWRO is uneconomical at salinities greater than 60 ppt due to the low recovery ratio and high specific energy consumption (7 Wh at 60 ppt). Moreover, beyond at least 80 ppt TDS, reverse osmosis becomes physically impossible since the osmotic pressure is greater than the membrane burst pressure (e.g., 69 bar). For this reason, thermal processes such as multi-stage flash distillation or multiple-effect distillation ($0.52-1.75 m$^{-3}$) are more economical, in areas such the Gulf Cooperation Council countries, because of the high water salinity (up to 60 ppt near land). Consequently, nearly 80% of Gulf desalination capacity, which accounts for more than half of worldwide seawater desalination capacity, is provided using energetically-intensive thermal processes (e.g., >20 Wh L$^{-1}$). Described herein are systems and processes that reduce both energy consumption and overall costs for desalination using a reversible electrochemical battery.

SUMMARY

Certain embodiments are directed to a desalination and energy storage system. The system comprises at least one water reservoir, at least one negative-ion redox electrode, at least one positive-ion redox electrode, a cation-exchange membrane disposed between the at least one negative-ion redox electrode and the water reservoir, and an anion-exchange membrane disposed between the at least one positive-ion redox electrode and the water reservoir. The at least one water reservoir comprises an input and an output, wherein water in the at least one water reservoir is reduced below a threshold concentration during a desalination operation mode. The at least one negative-ion redox electrode comprises a first solution of a first electrolyte material and is configured to accept, and have, a reversible redox reaction with at least one negative ion in the water. Also, the at least one positive-ion redox electrode comprises a second solution of a second electrolyte material and is configured to accept, and have, a reversible redox reaction with at least one positive ion in the water.

Additional embodiments are directed to a method comprising providing an electrochemical desalination battery unit, transporting water having a first salinity into the water reservoir of the battery unit, discharging the battery unit to provide water having a second salinity that is lower than the first salinity, and removing the water having the second salinity from the battery unit. The electrochemical desalination battery unit comprises at least one water reservoir having an input and an output, where the water in the at least one water reservoir is reduced below a threshold concentration during a desalination operation mode. At least one negative-ion redox electrode of the battery unit comprises a first solution of a first electrolyte material and is configured to accept, and have, a reversible redox reaction with at least one negative ion in the water, and at least one positive-ion redox electrode of the battery unit has a second solution of a second electrolyte material and is configured to accept, and have, a reversible redox reaction with at least one positive ion in the water. The battery unit further includes a cation-exchange membrane disposed between the at least one negative-ion redox electrode and the water reservoir and an anion-exchange membrane disposed between the at least one positive-ion redox electrode and the water reservoir.

Further embodiments are directed to a desalination and energy storage system. The system comprises a central reservoir, at least one negative-ion redox electrode, at least one positive-ion redox electrode, a cation-exchange membrane disposed between the at least one negative-ion redox electrode and the central reservoir, and an anion-exchange membrane disposed between the at least one positive-ion redox electrode and the central reservoir. The central reservoir comprises a first electrolyte solution, an input, and an output, wherein the first electrolyte solution has a first pH. The at least one negative-ion redox electrode comprises a second electrolyte solution and is configured to accept, and have, a reversible redox reaction with at least one negative ion in the first electrolyte solution, wherein the second electrolyte solution has a second pH. Also, the at least one positive-ion redox electrode comprises a third electrolyte solution and is configured to accept, and have, a reversible redox reaction with at least one positive ion in the first electrolyte solution, wherein the third electrolyte solution has a third pH. The first, second, and third pH is between and including 3-10.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below refers to the following figures, wherein the same reference number may be used to identify the similar/same component in multiple figures. However, the use of a number to refer to a component in a given figure is not intended to limit the component in another figure labeled with the same number. The figures are not necessarily to scale.

DETAILED DESCRIPTION

Figure 1A:
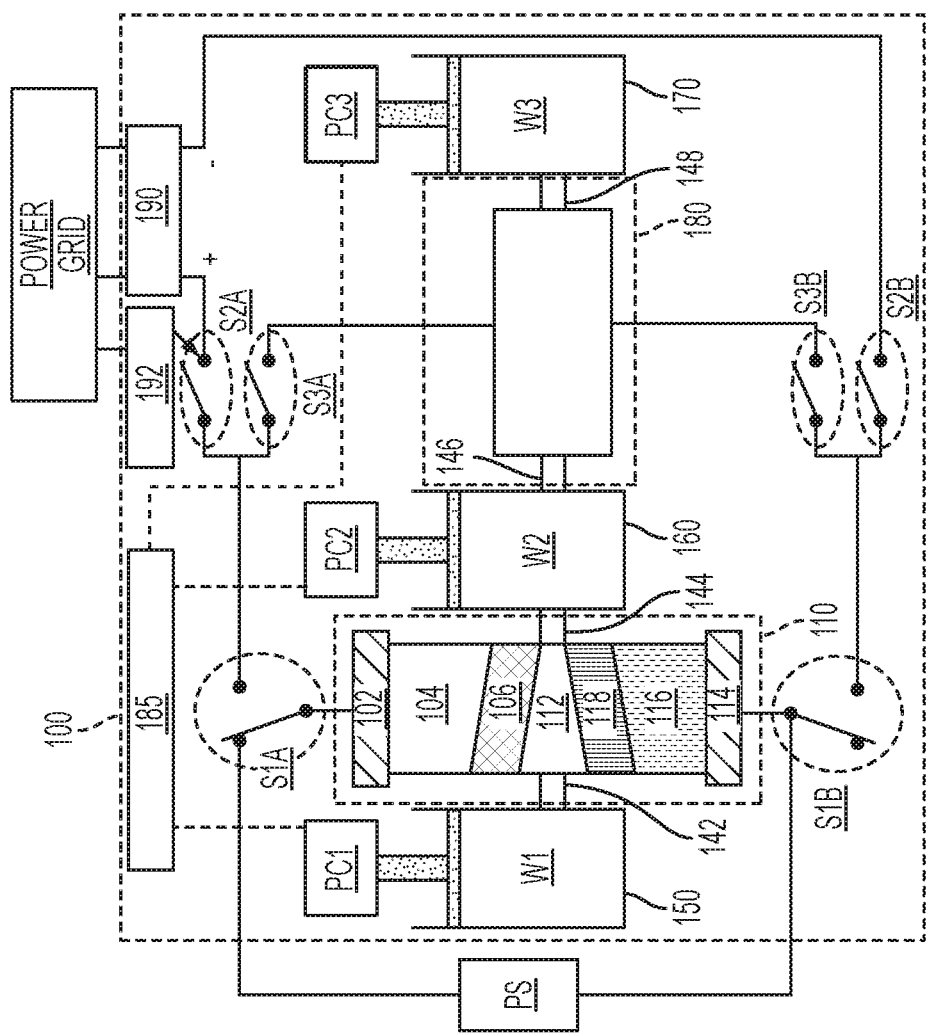
FIG. 1A is a schematic diagram of an energy storage system as coupled to a power supply unit and a power grid in accordance with certain embodiments.

The present disclosure is generally related to reversible electrochemical desalination systems and corresponding energy storage. Electrochemical approaches to desalination have the potential to scale modularly and ramp production easily, while maintaining high energetic efficiency and the ability to process high-salinity feeds. Some electrochemical desalination approaches, such as capacitive deionization or membrane capacitive deionization, require extremely high surface area electrodes to maximize their electrosorption capacity and are therefore economically limited to desalinating brackish water (e.g., 0.5-10 ppt TDS). Seawater desalination using electrodialysis is achieved by ion electromigration under an applied electric field and is used for treating brackish feed. Desalination of concentrated brine using electrodialysis is an alternative to reverse osmosis but is energy-intensive and costly even compared to thermal desalination processes.

On the other hand, electrochemical desalination driven by Faradaic reactions ought to perform better at higher salinities due to increased ionic conductivity. Desalination batteries using NaCl electrolytes such as a "mixing entropy battery", Ag|λ-$MnO_2$ desalination battery, and a "rocking chair battery" using Ni- and Fe-Prussian blue analogs are known. Unlike capacitive deionization, the energy capacity (or the desalination capacity) does not depend on the surface area of the electrodes, but rather, depends on the amount of reactants present. The Ag|$MnO_2$ and the rocking chair battery can both remove greater than 25% of salt from seawater at a low specific energy consumption (e.g., 0.14-0.29 Wh $L^{-1}$) when operated at a low current density (e.g., 0.50 mA $cm^{-2}$). Known redox desalination batteries achieve salt removal by incorporating $Na^+$ and $Cl^-$ ions into solid redox-active electrodes. The "rocking chair" and the Ag|λ-$MnO_2$ battery both have low nominal cell potential (e.g., 0.25-0.45 V) and low cathodic desalination capacity (e.g., 27.5-35 mAh $g^{-1}$), which may limit their adoption. Since the anode and cathode materials for these batteries are solid, the battery capacity cannot be decoupled from the power that it can deliver. Consequently, the system size and capital cost would likely be high for a real-world scaled system. However, an electrochemical system with low surface area requirements and practical system size that can store meaningful amounts of electrical energy, can provide a new paradigm of cost-effective desalination.

Flow batteries are attractive for grid storage because they allow the energy storage capacity of the battery to be decoupled from the power that the battery can deliver. Aqueous flow batteries can be integrated into an electrochemical desalination system because they share many common desalination capital requirements such as pumps, plumbing, and cell stack designs, which can be exploited to perform both desalination and energy storage. In principle, incorporating electrical energy storage into a desalination battery would enable further reductions in cost by facilitating load shifting on the electrical grid, enabling electricity arbitrage, and/or enabling deferral of investments into transmission and distribution infrastructure. A desalination battery with a high cell potential would function as a viable energy storage device. By tapping the revenue streams that are available to an energy storage technology, the system can defray desalination costs while simultaneously enabling increased adoption of renewables.

An example of a reversible electrochemical desalination-salination system is illustrated in FIG. 1A. The described electrochemical desalination battery can be operated in batch mode in certain embodiments or in a continuous mode in other embodiments. In batch mode, a volume of water to be treated is provided (e.g., pushed) in the redox desalination system. An electric potential is applied to the electrodes, and ions are collected in the two electrodes until the salt concentration in the water drops below a set limit (e.g. 2-5 ppt). Then the water is removed from the system. In some embodiments, the treated water is then provided to a second desalination system that utilizes a different type of desalination process such as reverse osmosis, capacitive deionization, or a thermal-based process. In a continuous flow mode, water flows through the system, and the total residence time for a volume of water in each part of the system is sufficient to achieve a desired reduction in salt concentration. In certain embodiments, separate units can be broken up into different stages and/or components with independently controlled electrodes to accommodate decreasing salinity levels at each successive step during a desalination process. This can also accommodate increasing salinity levels at each successive step during a salination process (during which water flows in the opposite direction of the water flow during the desalination process).

Turning to FIG. 1A, an energy storage system 100 includes an electrochemical desalination battery (EDB) unit 110. A set of electrical switches (S1A, S1B, S2A, S2B, S3A, S3B) is provided within the energy storage system 100 to provide a multi-configuration electrical connection that connects various nodes of the energy storage system 100 to a power supply unit PS (which can be either AC or DC according to various embodiments described herein, whether or not so stated), a power (e.g. electric) grid, and/or to other nodes of the energy storage system 100, and any combination thereof. As used herein, an "electrical switch" refers to any device that is capable of altering electrical connections of a circuit. The set of electrical switches (S1A, S1B, S2A, S2B, S3A, S3B) constitutes an operational mode control device that controls the operational modes of the energy storage system 100. As used herein, an "operational mode control device" refers to any device that can be employed to select an operational mode within a device configured to operate in two or more alternative operational modes. The operational mode control device is configured to select, among others, between a desalination mode and a salination mode based on presence or absence of power demand from a power grid and/or availability of external power as provided by a power supply unit PS for operation of the energy storage system 100.

The EDB unit 110 includes an anode (102, 104) and a cathode (114, 116), which can be embodied in various configurations. The anode (102, 104) is capable of accepting and having a reversible redox reaction with negative ions of the salts dissolved in water. The cathode (114, 116) is capable of accepting and having a reversible redox reaction with positive ions of the salts dissolved in water. The anode (102, 104) includes a negative electrode plate 102 and an electrolyte chamber 104 for containing an electrolyte solution. The cathode (114, 116) includes a positive electrode plate 114 and an electrolyte chamber 116 for containing an electrolyte solution. In certain embodiments, one or both of the cathode and anode includes intercalation material as an optional component for battery chemistries that employ intercalation. An electrolyte (e.g., water with dissolved salts such as sodium chloride) reservoir 112 is provided between the anode (102, 104) and the cathode (114, 116), and contains solution (e.g., water) to be salinated or desalinated.

In some embodiments, the separation distance between the anode (102, 104) and the cathode (114, 116) decreases along a direction of water flow during the desalination mode. Desalination is driven by ion diffusion in the EDB unit 110. When the salt concentration decreases, it takes greater effort for the ions to reach the electrodes (i.e., the anode and the cathode), effectively increasing the cell resistance. Reducing the electrode distance at a rate that keeps the internal resistance substantially constant leads to an energy-efficient desalination process, as well as energy-efficient recharging during the salination process. In certain embodiments, the separation distance between the anode (102, 104) and the cathode (114, 116) can be roughly inversely proportional to the concentration of ions as the water in treatment passes through the water reservoir 112 either in the desalination mode or in the salination mode. In alternative embodiments, the separation distance between the anode (114, 116) and the cathode (114, 116) remains substantially constant, or increases.

The negative electrode plate 102 and the positive electrode plate 114 each include a solid conductive material. In a given EDB, the plates 102, 114 can comprise the same conductive material or different conductive materials. Each electrode plate 102, 114 can comprise one or more of the following solid materials: zinc, iron, chromium, nickel, lead, titanium, copper, tin, silver, lead(IV) oxide, manganese (IV) oxide, sulfur, Prussian blue, Prussian blue derivatives, transition metal analogs of Prussian blue, carbon fiber, graphite, carbon felt, conductive carbon black as a solid or as an aqueous suspension, and other conductive forms of carbon. Alternatively, one or both of the electrode plates 102, 114 can be constructed as a gas diffusion electrode with hydrogen gas or oxygen gas as a reactant.

A first ion exchange membrane 106 is disposed between the water reservoir 112 and the anode (102, 104). In certain embodiments, the first ion exchange membrane 106 is an anion exchange membrane (AEM) that allows passage of anions and does not allow passage of cations, or it can be a negative-valence-selective membrane that allows passage of anions of greater negative charge while not allowing passage of anions of lesser negative charge or positive ions. In one embodiment, the first ion exchange membrane 106 can be a semi-permeable membrane. An example of a material for the first ion exchange membrane is NEOSEPTA AFX by ASTOM Corporation (8 cm$^2$).

A second ion exchange membrane 118 is disposed between the water reservoir 112 and the cathode (114, 116). In certain embodiments, the second ion exchange membrane 118 is a cation exchange membrane (CEM) that allows passage of cations and does not allow passage of anions, or it can be a positive-valence-selective membrane that allows passage of cations of greater positive charge while not allowing passage of cations of lesser positive charge or negative ions. In one embodiment, the second ion exchange membrane 118 can be a semi-permeable membrane. An example of a material for the second ion exchange membrane is Fumasep™ FKE-50, by FuMA-Tech, GmbH, Germany (8 cm$^2$).

The EDB unit 110 is an electrochemical cell used to treat water, including desalination and salination. The water contained in the central reservoir 112 can include one or more electrolytes that may be treated. For example, the electrolyte in the central reservoir 112 can be any combination of water-soluble ionic salts, including but not limited to, those encountered in seawater or wastewater. Example cations that can be present in the central electrolyte include, but are not limited to, hydronium, lithium, sodium, potassium, magnesium, calcium, aluminum, zinc, and iron. Example anions that can be present in the central electrolyte include, but are not limited to, chloride, bromide, iodide, halide oxyanions, sulfur oxyanions, phosphorous oxyanions, nitrogen oxyanions. When in desalination mode, the system 100 is configured to remove dissolved ionic species, such as those above, from water having an electrolyte concentration of up to the solubility limit of the ionic species in the solution in the central reservoir 112. In certain embodiments, that electrolyte concentration can exceed 60 parts per thousand, and in further embodiments, the electrolyte concentration can exceed 80 parts per thousand. The system 100 is further configured to reduce the salinity of water in the central reservoir 112 to about 5 parts per thousand, or in further embodiments, to about 2 parts per thousand, when operating in desalination mode.

The electrolyte chamber 104 of the anode (102, 104) and the electrolyte chamber 116 of the cathode (114, 116) can also include various solutions. The redox-active component of the anode electrolyte (anolyte) and/or cathode electrolyte (catholyte) can be an aqueous solution of any combination of the following, in one or more of their oxidation states, as their ions, oxocations, or oxoanions, and/or complexed to ligand(s): titanium(III), titanium(IV), vanadium(II), vanadium(III), vanadium(IV), vanadium(V), chromium(II), chromium(III), chromium(VI), manganese(II), manganese(III), manganese(VI), manganese(VII), iron(II), iron(III), iron (VI), cobalt(II), cobalt(III), nickel(II), copper(I), copper(II), zinc(II), ruthenium(II), ruthenium(III), tin(II), tin(IV), cerium(III), cerium(IV), tungsten(IV), tungsten(V), osmium(II), osmium(III), lead(II), zincate, aluminate, chlorine, chloride, bromine, bromide, tribromide, iodine, iodide, triiodide, polyhalide, halide oxyanion, sulfide, polysulfide, sulfur oxyanion, ferrocyanide, ferricyanide, a quinone derivative, an alloxazine derivative, a flavin derivative, a viologen derivative, a ferrocene derivative, any other metallocene derivative, a nitroxide radical derivative, a N,N-dialkyl-N-oxoammonium derivative, a nitronyl nitroxide radical derivative, and/or polymers incorporating complexed or covalently bound components of any of the aforementioned materials.

The anolyte and catholyte may also include an aqueous solution of the components of a pH buffer that may or may not be redox-active under typical operating conditions. In certain aqueous embodiments, the pH of the anolyte and catholyte is matched to the pH of the electrolyte in the central reservoir 112, which may, for example, be near-neutral (pH 5-9) for water desalination, acidic (pH 0-5) for treating acidic wastewater, or alkaline (pH 9-14) for treating alkaline wastewater. In some embodiments, it can be advantageous for the anolyte pH to be slightly lower than the other chambers such as when the anolyte is zinc/zinc chloride. In further embodiments, the pH of each of the electrolytes in the system is substantially the same within the EDB unit 110. In still further embodiments, the anolyte, catholyte, and water each has a pH between and including 3-10. Thus, the EDB unit 110 may include a pH monitoring and adjustment system for periodic and/or continuous pH monitoring.

As discussed above, the EDB unit 110 can operate as a flow battery in which unprocessed water is continuously supplied at an input, and processed water is continuously extracted from an output. The EDB unit 110, or cell stack, which includes flow plates, electrodes, gaskets, and membranes, can either have a planar geometry (similar to typical fuel cells), or the stack can comprise tubular systems that are similar in aspect ratio to reverse osmosis desalination modules. In one embodiment, a first water tank 150 and a second water tank 160 may be connected to the water reservoir 112. For example, the first water tank 150 can be connected to the water reservoir 112 through a first port 142, and the second water tank 160 can be connected to the water reservoir 112 through a second port 144. The first water tank 150 can contain first-type water W1 having a first level of salinity, and the second water tank 160 can contain second-type water W2 having a second level of salinity. For example, the first-type water may be seawater, and the second-type water may be brackish water (e.g., salinity of less than about 10 parts per thousand). The pressure of the first-type water W1 can be controlled by a first pressure controller PC1, which can apply pressure on the first-type water W1. The pressure of the second-type water W2 can be controlled by a second pressure controller PC2, which can apply pressure on the second-type water W2. Alternatively, water pumps (not shown) that push the water from respective water tanks into the EDB unit 110 at a desired flow rate may be employed in lieu of, or in addition to, pressure controllers (PC1, PC2). In certain embodiments, the first-type water W1 has a higher TDS count than the second-type water W2.

The direction of water flow between the first water tank 150 and the second water tank 160 is selected depending on whether the EDB unit 110 operates in a salination mode or in a desalination mode. The EDB unit 110 can alternately operate in the desalination mode in which ions are removed from the water in the water reservoir 112 and accumulate in the anode (102, 104) and the cathode (114, 116) while supplying power to an electrical load, and in the salination mode in which ions dissociate from ionic compounds accumulated in the anode (102, 104) and the cathode (114, 116) while storing energy provided from the power supply unit PS of the EDB unit 110.

The set of electrical switches also determine the operational mode of the EDB unit 110. A first set of electrical switches (S1A, S1B) controls electrical connection of the anode (102, 104) and the cathode (114, 116) of the energy storage system 100 to other electrical nodes. During operation in the salination mode, the first set of electrical switches (S1A, S1B) can connect the anode (102, 104) to a positive output voltage node of a DC power supply unit, i.e., the power supply unit PS, and can connect the cathode (114, 116) to a negative output voltage node of the DC power supply unit, respectively. As used herein, "DC power supply unit" refers to a power supply unit that provides DC power, i.e., direct current power that does not change polarity as a function of time. Ions are released from the anode (102, 104) and the cathode (114, 116) to salinate the water in the water reservoir 112, and energy is stored in the EDB unit 110 in the salination mode. In certain embodiments, anions can be released from ionic compounds that are formed on a solid material (such as the positive electrode plate 102) during a previous desalination mode operation, and cations can be released from ionic compounds that are formed on a solid material (such as the negative electrode plate 114) during the previous desalination mode operation. The EDB unit 110 can be configured to have a cell potential of at least 0.8 V, or in certain embodiments at least 1.25 V.

During operation in the desalination mode, the first set of electrical switches (S1A, S1B) can connect the anode (102, 104) to a positive electrode of an electrical load, and can connect the cathode (114, 116) to a negative electrode of the electrical load, respectively. The EDB unit 110 desalinates water in the water reservoir 112 while releasing stored energy as output power employing the anode (102, 104) as a positive output electrode and the cathode (114, 116) as a negative output electrode in the desalination mode. As used herein, "DC output power" refers to output power provided in the form of direct current, i.e., output power that does not change polarity as a function of time.

The electrical load can include the power grid. A second set of switches (S2A, S2B) can connect the anode (102, 104) and the cathode (114, 116) of the EDB unit 110 to an inverter 190. The inverter 190 converts the DC output of the EDB unit 110 to an AC power output with a matching amplitude (i.e., the same amplitude as the amplitude of the AC voltage of the power grid) and a synchronous phase to feed into the power grid. Thus, the power released from the EDB unit 110 during the desalination mode can be transmitted to the power grid through the first and second sets of switches (S1A, S1B, S2A, S2B) and the inverter 190. The inverter 190 can be provided as part of the energy storage system 100, or can be provided externally on the side of the power grid. In one embodiment, the second set of switches (S2A, S2B) can be controlled by a power grid load monitor 192, which monitors the total power load on the power grid, and connects the second set of switches (S2A, S2B) with the inverter 190 only at, or near, the peak power demand on the power grid.

In certain embodiments, the energy storage system 100 further includes a second desalination unit 180. The second desalination unit 180 can utilize a desalination technique other than an electrochemical battery such as reverse osmosis, capacitive deionization, electrodialysis, and thermal techniques. In one embodiment, the second unit 180 can perform a second desalination process while the EDB unit 110 operates in the desalination mode, and can perform a salination process while the EDB unit 110 operates in the salination mode. In further embodiments, even though a second desalination unit 180 is present in the system 100, it may not operate even though the EDB unit 110 is operational.

The second desalination unit 180 can have a water port (herein referred to as a third water port 146) that is connected to water having a higher TDS count, and another water port (herein referred to as a fourth water port 148) that is connected to water having a lower TDS count. For example, the water having the higher TDS count can be the second-type water W2 contained within the second water tank 160, and the water having the lower TDS count can be a third-type water W3 contained within a third water tank 170. The pressure of the second-type water W2 can be controlled by a second pressure controller PC2, which can apply pressure on the second-type water W2 as needed. The pressure of the third-type water W3 in the third water tank 170 can be regulated by a third pressure controller PC3, which can apply pressure on the third-type water as needed. Alternatively, water pumps (not shown) that push the water from respective water tanks into the second unit 180 at a desired flow rate may be employed in lieu of, or in addition to, pressure controllers (PC2, PC3).

The second-type water W2 can have the second level of salinity as discussed above. The third-type water W3 can have a third level of salinity, which is lower than the second level of salinity. In other words, the second-type water W2 has a higher TDS count than the third-type water W3. For example, the TDS count of the third-type water W3 can be less than about 0.5 ppt, or at a level considered potable water, although a higher TDS count can also be employed.

Similar to the EDB unit 110, the direction of water flow between the second water tank 160 and the third water tank 170 is selected depending on whether the second unit 180 operates in a salination mode or in a desalination mode. The second unit 180 can alternately operate in the desalination mode in which ions are removed from input water while consuming power supplied to the second unit 180, and in the salination mode in which ions are introduced to the input water while releasing energy stored in the second unit 180.

During operation of the second unit 180 in the desalination mode, at least a fraction of the output power generated from the EDB unit 110 can be applied to the second unit 180, if necessary for operation, to provide power input for the operation of the second unit 180. The routing of a fraction of the output power generated from the EDB unit 110 to the second unit 180 can be effected by a third set of electrical switches (S3A, S3B), which can be connected in a parallel connection with respect to the power grid and the second set of electrical switches (S2A, S2B). The power input required to operate the second unit 180 is typically a small fraction of the power stored in the EDB unit 110 when a comparable volume of water passes through the EDB unit 110 and the second unit 180. Therefore, by routing a fraction of the energy released from the EDB unit 110 to the second unit 180 through the third set of switches (S3A, S3B), the second unit 180 can be adequately powered, and additional power can be released from the EDB unit 110 to the power grid during the desalination mode.

In addition, a process control device 185 can control the operational modes of the various components of the energy storage system 100. The process control device 185 can include a water flow control device as a component therein. The water flow control device controls the pressures of the first-type water W1, the second-type water W2, and/or the third-type water W3 through the first, second, and/or third pressure control devices (PC1, PC2, PC3) or through water pumps (not shown). The water flow control device may be configured to induce flow of water in different directions between the desalination mode and the salination mode in the manner described above. Specifically, the water flow control device can induce water to flow from the EDB unit 110 to the second unit 180 during the desalination mode, and can induce water to flow from the second unit 180 to the EDB unit 110 or from the EDB unit 110 to the second unit 180 during the salination mode. The systems and methods described herein employ some of the same techniques disclosed in U.S. Pat. Nos. 9,340,436; 9,673,472; and 9,670,077, which are all incorporated herein by reference.

Figures 2A, 2B:
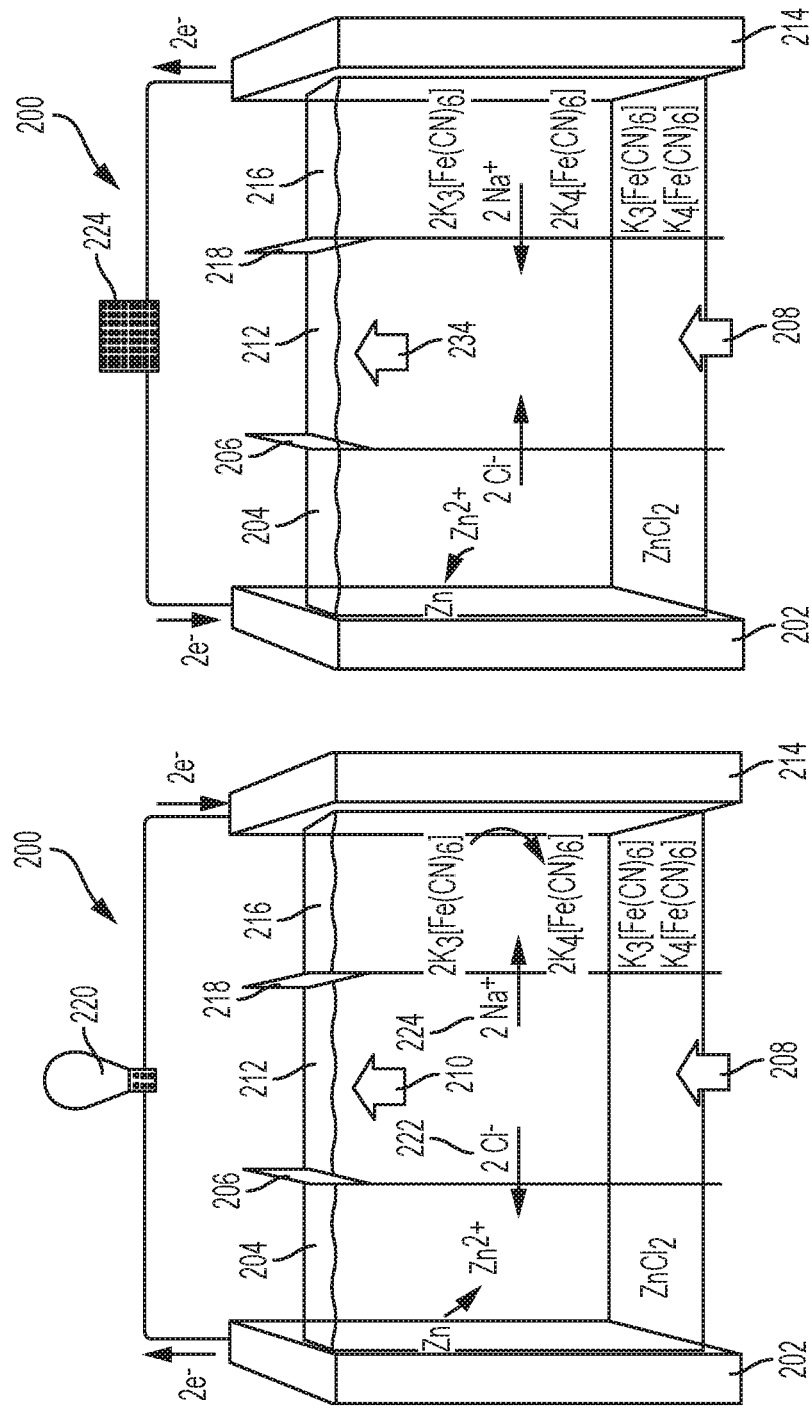
FIG. 2A illustrates a desalination mode of an electrochemical desalination battery in accordance with certain embodiments.
FIG. 2B illustrates a salination mode of an electrochemical desalination battery in accordance with certain embodiments.

By way of a non-limiting example only, FIGS. 2A-B illustrate an electrochemical desalination battery system, as described above, as a zinc|ferricyanide hybrid desalination flow battery operating at a high nominal cell potential ($E^0$=+1.25 V) providing high round-trip efficiency and electrical storage. For example, the hybrid flow battery achieves extensive first-pass desalination while simultaneously supplying electrical energy (e.g., 10 Wh $L^{-1}$). The battery provides 85% salt removal from simulated seawater (35 g $L^{-1}$ NaCl) and 86% salt removal from hypersaline brine (100 g $L^{-1}$ NaCl), together with reversible battery operation over one hundred hours with high round-trip efficiency (e.g., 84.8%). The system has a high operating voltage ($E^0$=+1.25 V), low specific energy consumption (2.11 Wh $L^{-1}$ for 85% salt removal), and a desalination flux (10.8 mol $m^{-2}$ $h^{-1}$) on par with reverse osmosis membranes. Moreover, salt removal is similarly effective at higher feed salinities, for which reverse osmosis becomes physically impossible due to the osmotic pressure required. The devices described herein may be particularly useful in areas of the world that rely on desalination for their fresh water needs, especially where the salinity level is high. In further embodiments, the hybrid battery can be used in minimal liquid discharge (MLD) wastewater treatment if operated as a brine concentrator.

In certain embodiments, the cell 200 operates at a moderate pH (e.g., 3-10), where water to be treated, such as seawater, flows through a central reservoir 212. The central reservoir 212 contains about 3 mL of aqueous NaCl at a given time, which enters 208 from one side/port and exits 210 from another side/port. The central reservoir 212 is bounded on one side by an anolyte reservoir 204 containing about 50 mL of an aqueous solution of $ZnCl_2$ (0.3 M) and a zinc anode 202, and bounded on the other side by a catholyte reservoir 216 containing 50 mL of an aqueous solution of $K_4Fe(CN)_6$ (0.3 M)+$K_3Fe(CN)_6$ (0.3 M) and a graphite cathode 214. This combination of reactants generates an energy density of 10 Wh $L^{-1}$ (anolyte and catholyte volumes only). An anion-exchange membrane 206 (e.g., ASTOM Neosepta AFX, 8 $cm^2$) separates the anolyte reservoir 204 from the central reservoir 212, which is separated from the catholyte reservoir 216 by a cation-exchange membrane 218 (e.g., Fumasep FKE-50, 8 $cm^2$). All three electrolyte solutions are circulated to and from external reservoirs (not shown) using peristaltic pumps (e.g., by Control Company, 10 mL $min^{-1}$, not shown), and Viton gaskets (e.g., 0.76 mm thick) can be used to seal each reservoir 204, 212, 216. To improve the surface area of the electrodes 202, 214 and to provide structural support for the membranes 206, 218, copper mesh (e.g., 60×60 mesh, by McMaster-Carr) is pressed onto the zinc anode 202, and carbon fiber paper (e.g., two sheets of Sigracet 10BI, pre-baked in air for four hours at 400° C.) is pressed onto the graphite cathode 214. A nylon mesh (e.g., 31×31 mesh, by McMaster-Carr) provides structural support within the central reservoir 212. The extent of desalination by the cell 200 is measured using a TDS meter (e.g., HI-98192, by Hanna Instruments, not shown), which is calibrated using purchased stock solutions.

FIG. 2A illustrates a desalination mode where during operation, the discharge half-cycle reactions result in the removal of NaCl from the central electrolyte (e.g., seawater). The zinc anode 202 is oxidized to $Zn^{2+}$ ions, drawing $Cl^-$ ions into the anolyte tank 204 through the anion-exchange membrane 206, while ferricyanide is reduced to ferrocyanide in the catholyte, drawing $Na^+$ ions into the catholyte tank 216 through the cation-exchange membrane 218. The discharge cycle is represented by the flow of electrons from the power source 220 toward the cathode 214 and from the anode 202 toward the power source 220.

FIG. 2B illustrates a salination mode where subsequent charge half-cycle reactions result in the introduction of NaCl to the central electrolyte. Before the subsequent charge half-cycle, the desalinated water 210 is removed and replaced with a new volume of seawater 208. Then, $Na^+$ and $Cl^-$ ions are driven into the central reservoir 212 by the reverse reactions, thereby producing concentrated brine 234. The charge cycle is represented by the flow of electrons from the power grid 224 toward the anode 202 and from the cathode 214 toward the power grid 224. The net result over a full discharge-charge cycle is therefore the production of two streams of water, one depleted 210 and the other enriched 234 in NaCl. The reversible half-cell and overall reactions are provided below.

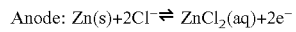
Anode: $Zn(s)+2Cl^- \rightleftharpoons ZnCl_2(aq)+2e^-$

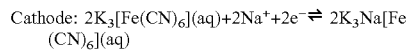
Cathode: $2K_3[Fe(CN)_6](aq)+2Na^++2e^- \rightleftharpoons 2K_3Na[Fe(CN)_6](aq)$

Figure 3A:
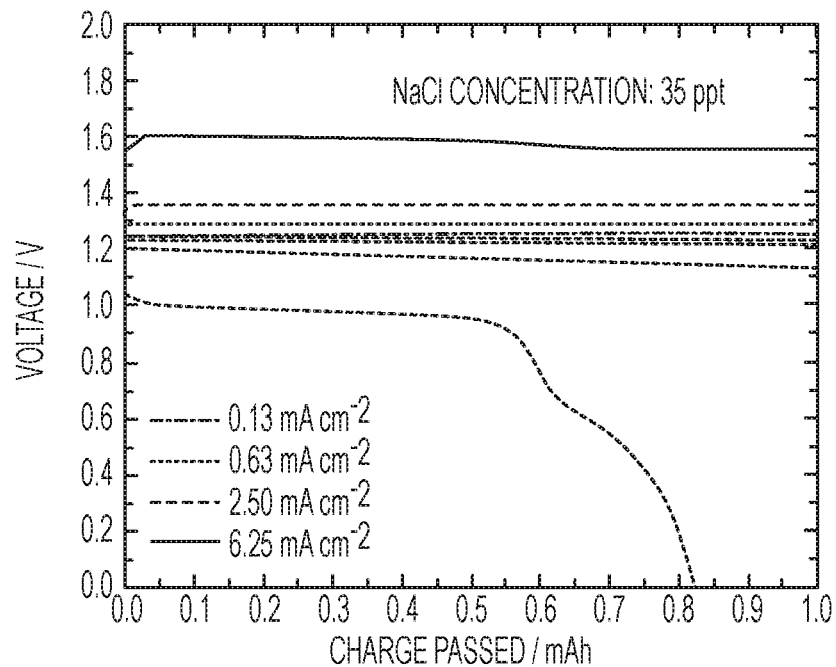
FIG. 3A shows charge-discharge curves for shallow cycling performed using a full battery cell for seawater having a NaCl concentration of 35 g $L^{-1}$.
Figure 3B:
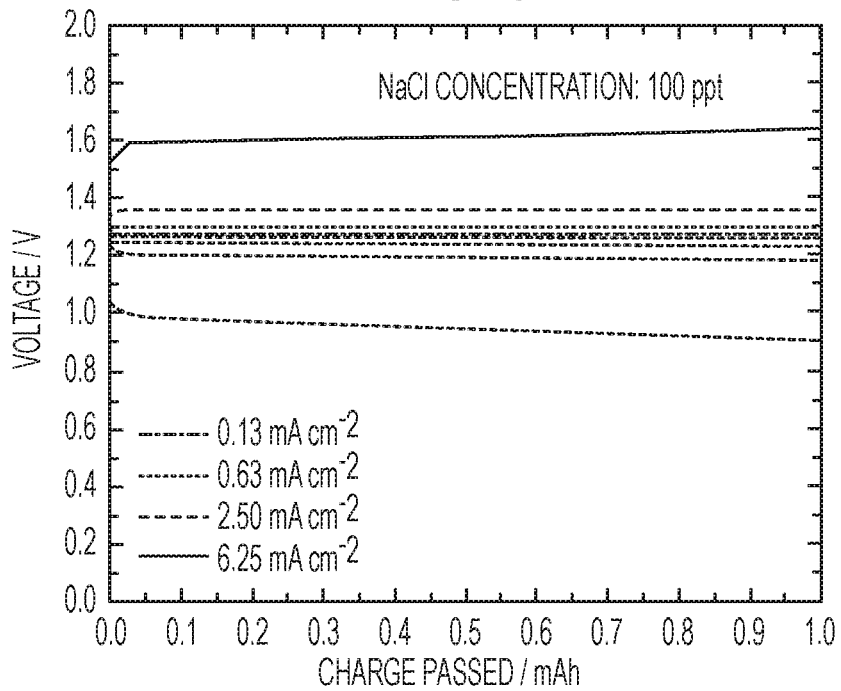
FIG. 3B shows charge-discharge curves for shallow cycling performed using a full battery cell for concentrated brine having a NaCl concentration of 100 g $L^{-1}$.

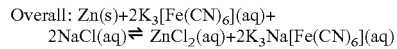
Overall: $Zn(s)+2K_3[Fe(CN)_6](aq)+2NaCl(aq) \rightleftharpoons ZnCl_2(aq)+2K_3Na[Fe(CN)_6](aq)$ The polarization resistance of a redox desalination cell, as described above in connection with FIGS. 2A-B, and having a 0.8 mm seawater chamber 212 width was evaluated by performing shallow cycling. FIGS. 3A-B show the cell voltage when charging or discharging the cell at different current densities (or NaCl flux) for two different NaCl concentrations. FIG. 3A shows the charge-discharge curves for shallow cycling performed using the full cell for seawater having a NaCl concentration of 35 g $L^{-1}$, and FIG. 3B shows the charge-discharge curves for shallow-cycling performed using the full cell for concentrated brine having an NaCl concentration of 100 g $L^{-1}$. Mass transport limitations were observed during discharge at the highest current densities at the lower NaCl concentration in FIG. 3A. The full cell area-specific resistance (ASR) and molar energy consumption were used as metrics to compare the effect of water salinity on cell performance. Since concentrated solutions of NaCl have higher ionic conductivity, the ASR calculated from the shallow cycling decreased marginally from 31 $\Omega cm^2$ (35 g $L^{-1}$ NaCl) to 30 $\Omega cm^2$ (100 g $L^{-1}$ NaCl). The reduction in ASR enables efficient NaCl transport.

Figure 4:
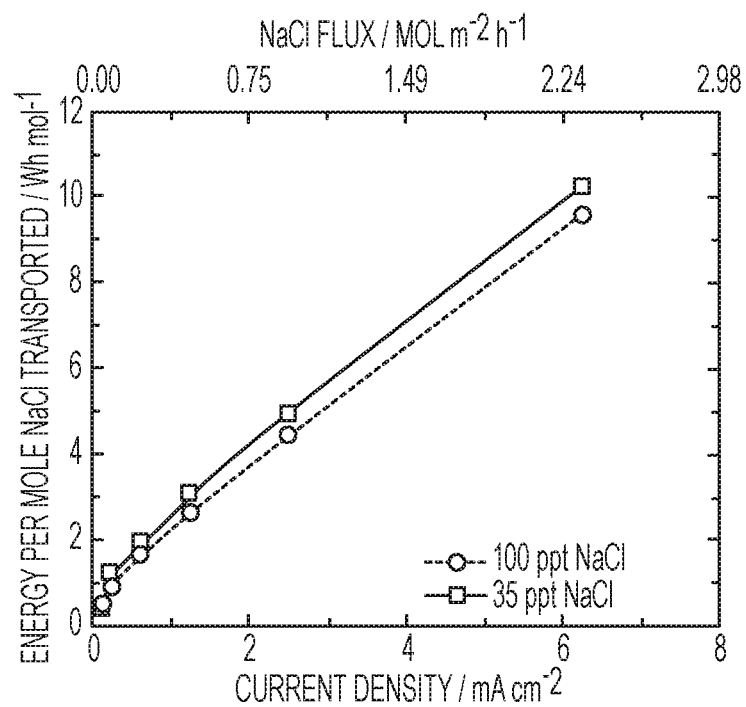
FIG. 4 shows the effect of current density (NaCl flux) on the energy required per mole of NaCl removed.

FIG. 4 shows the effect of current density (NaCl flux) on the energy required per mole of NaCl removed. As can be seen, the impact on the molar energy consumption of the cell is more pronounced at higher operating current densities. For example, the molar energy consumption of the cell operated at 6.25 mA $cm^{-2}$ (2.33 mol $m^{-2}$ $h^{-1}$) decreased from 10.3 Wh $mol^{-1}$ at a salinity of 35 g $L^{-1}$ NaCl to 9.6 Wh $mol^{-1}$ at 100 g $L^{-1}$ NaCl.

Figure 5:
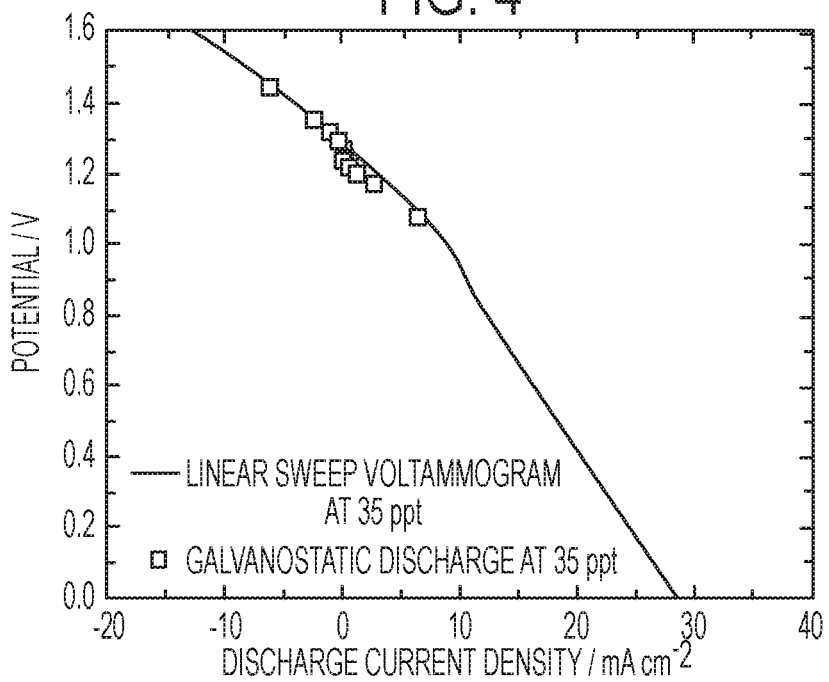
FIG. 5 illustrates a linear sweep voltammogram for a cell using seawater having an NaCl concentration of 35 g $L^{-1}$.

In addition, linear sweep voltammetry was performed on a newly assembled cell having a 0.8 mm central chamber width and using a NaCl concentration of 35 g $L^{-1}$ to ascertain the instantaneous effect of cell polarization on current density. The cell potential was fixed at the charge/discharge currents of FIGS. 3A-B and taken after 0.5 mAh of charge was passed. A separate polarization curve collected by performing a linear sweep voltammogram from 1.6 V to 0.0 V at a sweep rate of 0.1 V $s^{-1}$ is shown by the solid line in FIG. 5. As can be seen, the maximum attainable current density at short circuit (0 V) was 29 mA $cm^{-2}$ (equivalent flux 10.8 mol $m^{-2}$ $h^{-1}$). The ASR obtained from a linear sweep voltammogram (29 $\Omega cm^2$ at a rate of 0.1 V $s^{-1}$) was consistent with the data from the shallow cycling shown in FIGS. 3A-B. As mentioned above, mass transport limitations were observed when the cell was discharged above a current density of 8 mA $cm^{-2}$ at a pumping speed of 10 mL $min^{-1}$. This is evidenced by the dip in potential at 1.0 V. Increasing the reactant flow rate did not significantly impact the current density at which the potential dip is observed (8 mA $cm^{-2}$). This implies that the mass-transport regime at this point is governed by concentration gradients of the diffusing species within the ion-exchange membranes.

Figure 6A:
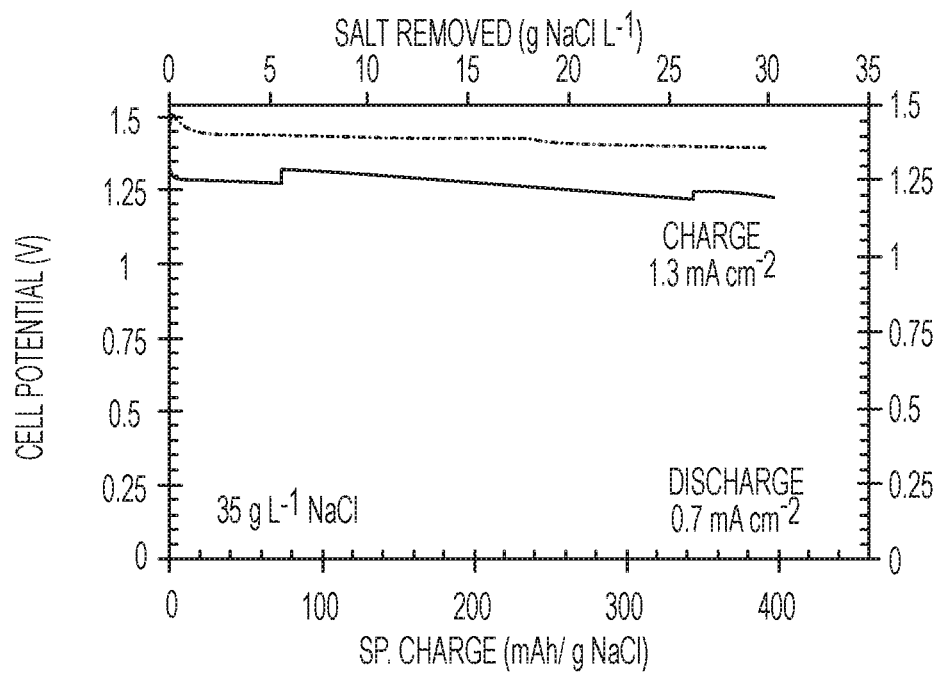
FIG. 6A shows charge-discharge curves for deep cycling with a full battery cell for seawater having a NaCl concentration of 35 g $L^{-1}$.
Figure 6B:
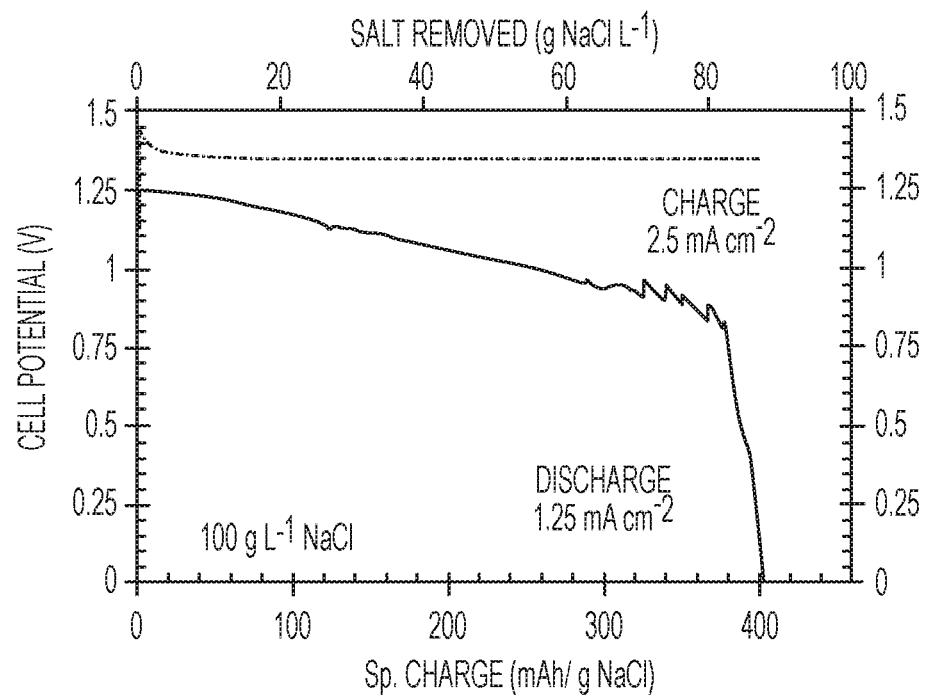
FIG. 6B shows charge-discharge curves for deep cycling with a full battery cell for seawater having a NaCl concentration of 100 g $L^{-1}$ (e.g., concentrated brine)

Further, deep cycling was performed to evaluate the ability of the zinc|ferricyanide hybrid desalination flow battery to achieve a high depth of desalination, and the resulting charge-discharge curves are shown in FIGS. 6A-B. FIG. 6A shows the curves for a cell having a seawater concentration of 35 g L$^{-1}$ NaCl in the central reservoir, and FIG. 6B shows the curves for a cell having a concentrated brine solution of 100 g L$^{-1}$ NaCl in the central reservoir. A cell with a 0.8 mm central, seawater reservoir width first having 3.00 mL of 35 g L$^{-1}$ NaCl was discharged at a constant current of 0.70 mA cm$^{-2}$. The salinity of the water in the central reservoir was found to be 4.81 g L$^{-1}$, corresponding to 85% salt removal. As can be seen in FIG. 6A, the area under the curve corresponds to an energy consumption of 3.52 Wh mol$^{-1}$ (or 2.11 Wh L$^{-1}$). Also, high salinity brines were evaluated by filling the central reservoir with 100 g L$^{-1}$ NaCl and discharging the cell at 1.25 mA cm$^{-2}$. The final salinity was measured to be 13.4 g L$^{-1}$ NaCl, corresponding to 86% salt removal at an energy consumption of 12.7 Wh L$^{-1}$, as shown in FIG. 6B. The higher ending salinity was likely a consequence of the higher current density. This shows that the cell is capable of supporting first-pass desalination of seawater, or concentrated brine, down to at least 5 ppt TDS. Below 5 ppt TDS, the conductivity of the seawater chamber (and therefore the entire cell) becomes too low for efficient operation, though salinities of around 2 ppt TDS are achievable. Regardless, a second stage of desalination is used to produce water with a low enough salinity to be potable. The second stage could be performed, for example, by using brackish water reverse osmosis (RO) or capacitive deionization systems for an economical second-pass desalination producing potable water.

Figure 7A:
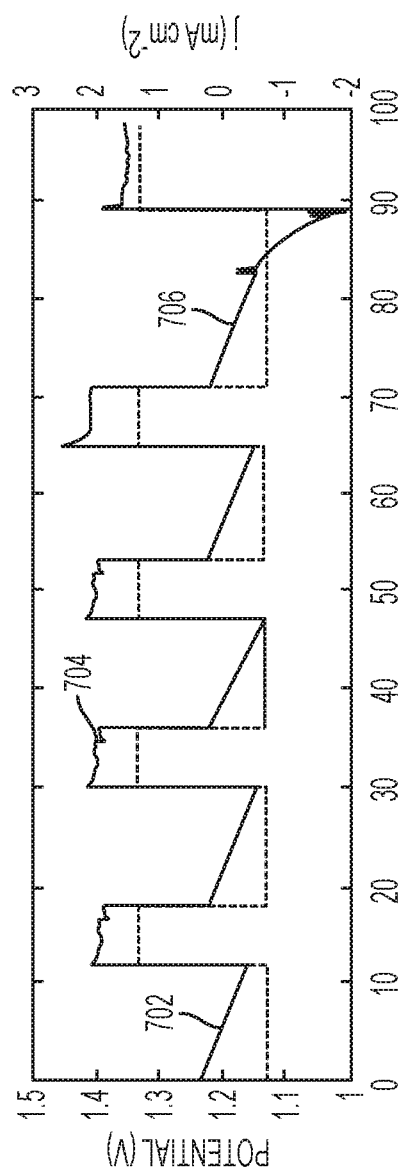
FIG. 7A is a profile for five successive charge-discharge cycles.
Figure 7B:
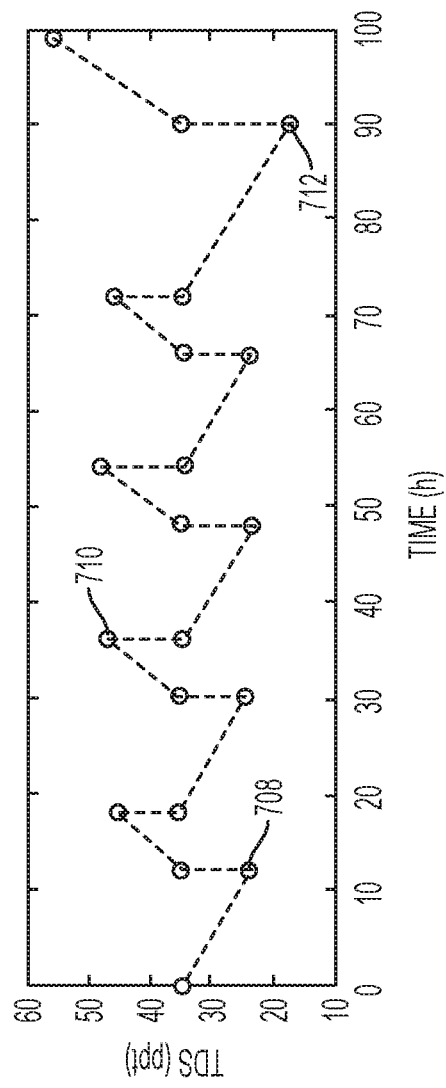
FIG. 7B shows water salinity measurements during the successive charge-discharge half-cycles of FIG. 7A.

FIGS. 7A-B show results of a multi-cycle experiment and demonstrate reversible cycling for a cell. FIG. 7A is the charge-discharge profile, and FIG. 7B shows the water salinity during successive charge-discharge half-cycles. The cell had a 10 mm seawater central reservoir width and was filled with simulated seawater (i.e., 35 g L$^{-1}$ NaCl, 8.0 mL). The cell further employed flowing anolyte and catholyte (25 mL each) and the central seawater reservoir (8 mL) was stagnant. The central water reservoir was maintained in a non-flowing condition to avoid potential water losses through the silicone pump tubing. This design limited the maximum current and resulted in increased resistive losses, but it allowed adequate water volume for reliable salinity measurements and enabled continuous operation over one hundred hours. The cell was discharged at a current density of 0.7 mA cm$^{-2}$ for twelve hours 702. Once discharging (first-pass desalination mode) was complete, the central reservoir was drained and replaced with new seawater, then the cell was charged at 1.3 mA cm$^{-2}$ for six hours 704 (e.g., salination, brine formation mode), thereby completing one full discharge/charge (i.e., desalination/salination) cycle. Four identical cycles were performed, and then one last cycle was performed at the same current densities but for a longer duration (eighteen hour discharge, nine hour charge) in order to effect a higher degree of desalination (60% vs. 40%). To evaluate the degree of desalination or salination, the salinity of the NaCl solution in the central reservoir was measured at the beginning and end of each half-cycle.

As may be seen in FIG. 7B, a drop 708 or rise 710 in salinity was observed at the end of each discharge or charge half-cycle, respectively. In FIG. 7B, the circles represent measured data points, while the dashed line provides a guide for the order in time in which the points were measured. The observed degree of desalination or salination was always slightly lower (by about 10%) than expected when considering the amount of charge passed, and therefore the amount of Na$^+$ and Cl$^-$ ions transported. This is most likely caused by a small amount of electro-osmotic water crossover between the central reservoir and the anolyte or catholyte reservoirs. However, no significant change in volume (e.g., within 5%) was observed after each half-cycle. The median round-trip efficiency at 40% salt removal was 84.8% for the five cycles, although discharge was continued beyond 40% salt removal for the fifth cycle 706. The net energy expenditure per cycle is effectively the energy required to separate the feed seawater into two streams, namely desalinated water and brine. From the cycling results, the specific energy consumption of this cell (1.3 mA cm$^{-2}$ charge, 0.7 mA cm$^{-2}$ discharge) was 1.63 Wh L$^{-1}$ (40% salt removal) and 2.19 Wh L$^{-1}$ (60% salt removal).

Figure 8A:
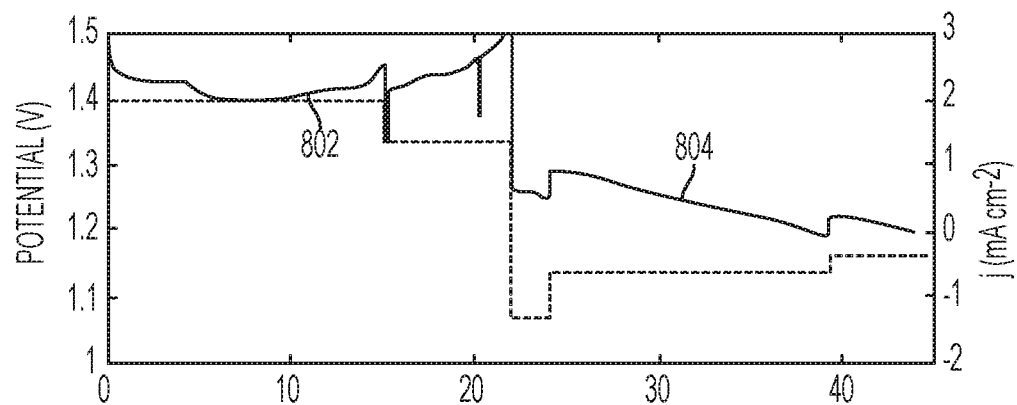
FIG. 8A is a charge-discharge profile for a deep cycle of an electrochemical desalination battery in accordance with certain embodiments.
Figure 8B:
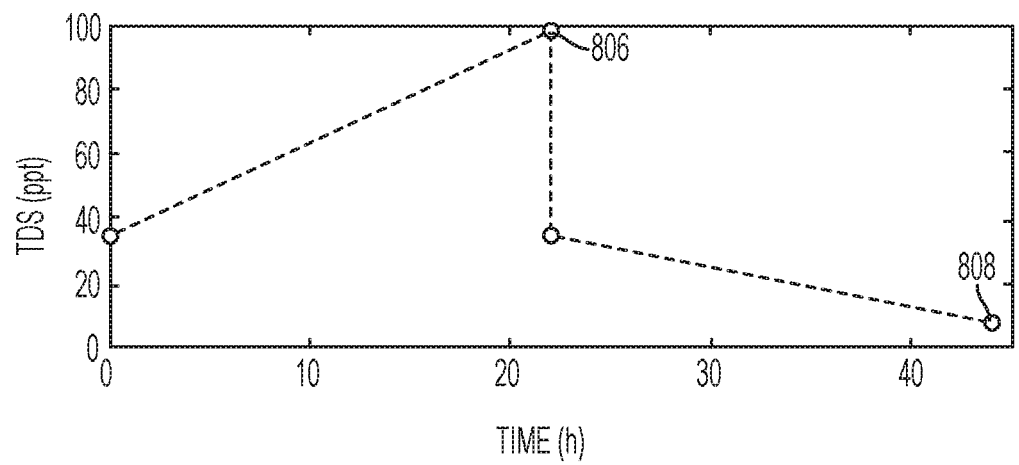
FIG. 8B shows water salinity measurements during the successive charge-discharge half-cycles of FIG. 8A.

To further evaluate the performance limit of the redox desalination battery of FIGS. 7A-B, the maximum extent of desalination was evaluated to assess feasibility for large-scale seawater desalination uses. FIG. 8A shows the charge-discharge profile for deep cycling of a brine concentration, and FIG. 8B shows the water salinity during the successive charge-discharge half-cycles. Again, in FIG. 8B, the circles represent measured data points, while the dashed line provides a guide for the order in time in which the points were measured. Here the central reservoir containing 35 g L$^{-1}$ NaCl water and having a width of 10 mm was charged at a high current density for twenty-two hours 802 until the salinity in the center reservoir was found to reach 100 ppt 806. The brine formed was replaced with more seawater (35 g L$^{-1}$ NaCl) and discharged in stages at progressively lower current densities for a further twenty-two hours 804. After, the salinity in the center reservoir was found to have decreased to 7.60 g L$^{-1}$ 808. Periodic measurements of the salinity and the high-frequency cell impedance during discharge revealed increasing impedance as the salinity of the center reservoir decreases. By extending the discharge time, desalination of a larger volume of seawater (60 mL) to below 10 g L$^{-1}$ NaCl in the 10 mm cell was also achieved.

As discussed above, a cell with a 0.8 mm seawater central reservoir width is capable of 86% desalination (e.g., 35 g L$^{-1}$ NaCl→4.80 g L$^{-1}$ NaCl) at a specific energy consumption of 2.11 Wh L$^{-1}$ and a flux of 0.34 mol m$^{-2}$ h$^{-1}$. The cell with a 0.8 mm seawater reservoir width has a lower energy consumption and a higher flux than one with a 10 mm width/thickness. This is expected because the cell ASR depends on the thickness of the central reservoir. The cell ASR rises sharply, and the conductivity of the central water reservoir correspondingly decreases, once the central reservoir is desalinated to a threshold concentration. While the threshold concentration depends upon the architecture of the cell, the threshold concentration represents a point, or transition, at which operation of the cell requires increased energy consumption and becomes increasingly inefficient.

For example, for the above-described cell, once the central reservoir has been desalinated below around 10 ppt NaCl, or in certain embodiments below around 8 ppt NaCl, or in further embodiments below around 7 ppt NaCl, the rate of increase of the ASR climbs sharply for every subsequent ppt NaCl decrease. Below the threshold concentration, the gravimetric specific energy consumption, defined as the energy to remove a unit mass of NaCl from a solution at a certain salinity, has now increased to 2-3 times the starting value when the concentration was 35 ppt NaCl. Instead, a different, secondary desalination process is required to produce drinkable fresh water (TDS<0.5 ppt) from the brackish water produced by the desalination battery. An example of a secondary desalination process is a secondary brackish water RO (BWRO) system, and such a system is estimated to require an additional 1.36 Wh L$^{-1}$ to produce drinkable fresh water from water with at most 10 ppt NaCl.

The specific energy consumption and water flux for a desalination battery as described above and in connection with BWRO are comparable to the typical specific energy consumption for SWRO (3-6 Wh $L^{-1}$). However, the desalination battery can be operated at high salinities such as above about 60 ppt, and SWRO cannot because the required pressure for SWRO is too high for the RO membranes to withstand. Desalination of 100 g $L^{-1}$ NaCl to 0.5 ppt using the desalination battery in conjunction with a downstream secondary desalination process, such as BWRO, consumes (12.7+1.36)=14.06 Wh $L^{-1}$ of energy, which also compares favorably to electrodialysis (30-40 Wh $L^{-1}$) and thermal distillation processes (20-60 Wh $L^{-1}$).

Figure 9:
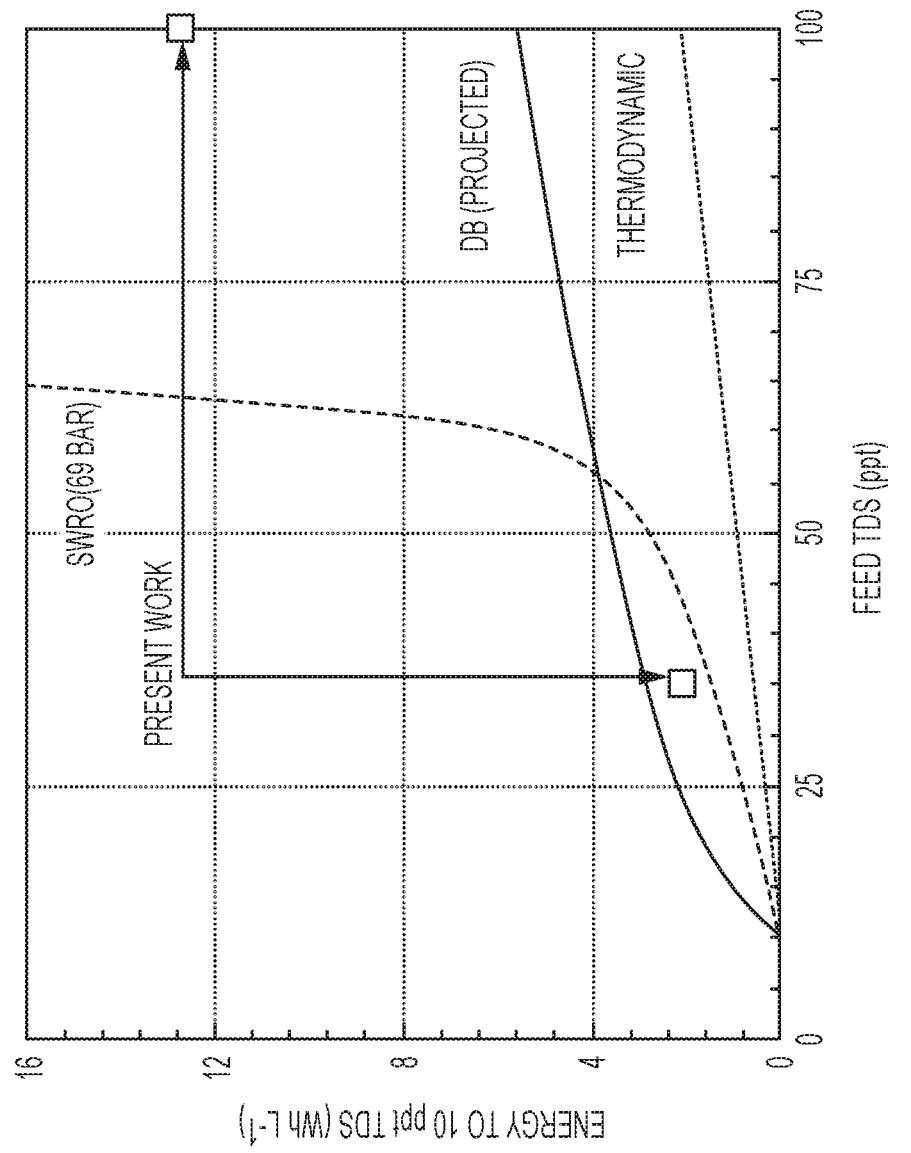
FIG. 9 is a comparison of energy consumption for a SWRO system and an electrochemical desalination battery in accordance with certain embodiments.

Energy consumption of a zinc|ferricyanide hybrid desalination flow battery is further compared with that of SWRO in FIG. 9. The projected energy consumption for the desalination battery is 20 mA $cm^{-2}$ and for a SWRO unit it is 12.5 L $m^{-2}$ $h^{-1}$ to achieve a first pass desalination of TDS<10 ppt, such as 5 ppt, or in other embodiments 2 ppt. A secondary desalination is used, such as a secondary (brackish) RO system, and it is estimated to require an additional 1.36 Wh $L^{-1}$ to produce potable fresh water (i.e., TDS<0.5 ppt). The desalination battery data (the solid line) was obtained at a lower current density (<2 mA $cm^{-2}$) and does not include pumping losses which are estimated to be 0.1 Wh $L^{-1}$ in an optimized system. The 100 ppt data point in FIG. 9 has a higher energy consumption because that point was taken at a higher current density to allow for practical, experimental timescales. FIG. 9 also shows the energy consumption as a function of feed salinity for a SWRO system operating at 69 bar with a water recovery ratio of 0.5 and water flux of 12.5 L $m^{-2}$ $h^{-1}$ as modeled using Desalination Economic Evaluation Program (v. 5.11). The effect of feed salinity on the energy required to produce partially desalinated water at about 10 ppt TDS was used to determine possible use cases for either SWRO or the described hybrid desalination battery, including an estimated additional 1.36 Wh $L^{-1}$ for a secondary BWRO system in order to bring TDS below 0.5 ppt.

In view of the above, SWRO is still predicted to require less energy to operate a desalination process given a feed salinity of up to about 50 ppt TDS. However, above this threshold the desalination battery becomes more effective at salt/electrolyte removal. Also, the limited mechanical strength afforded by RO membranes places an upper limit on the maximum feed salinity on which SWRO can be used. For hypersaline brines above 50 ppt, the redox desalination battery becomes the more economically viable non-thermal option. In addition, the redox desalination battery is also capable of directly concentrating brine to at least 100 ppt, which can be applied toward minimal liquid discharge (MLD) processes that have collocated energy storage needs.

Thus, the redox desalination hybrid flow battery presents an additional benefit of having an energy storage capacity (e.g., about 10 Wh $L^{-1}$) as compared with reported redox desalination chemistries. The high ASR for a battery (~30 $\Omega cm^{-2}$ for the desalination battery vs. ~0.5 $S\Omega cm^{-2}$ for vanadium flow batteries), which arises due to the cell architecture that is required to achieve desalination (e.g., central reservoir for seawater) and a limited NaCl concentration place boundaries on use of the cell solely for grid-scale energy storage. Nevertheless, a high round-trip efficiency was achieved by virtue of its high cell potential, as well as the lower current density (or NaCl removal rate) associated with membrane-based desalination processes.

In further embodiments, synergetic advances in flow batteries can be leveraged for the above-described hybrid flow desalination battery. For example, a full-cell polarization ASR of less than 4 $\Omega cm^2$ is possible for a similar flow battery cell even with a NaCl concentration below 1.0 M in the central reservoir. In other embodiments, the cell has reduced thickness and improved flow fields to uniformly distribute chemical reactants across the electrode surfaces while keeping the electrodes in intimate contact with the membranes. Also, the principle of the above-described desalination battery is agnostic to the reactants. For example, a viologen derivative can be used to avoid potential problems with the formation of insoluble ZnO if the pH rises slightly as a result of water splitting at the anode, or of membrane damage from zinc dendrites that form during cell charging. Moreover, some viologens possess extremely high stability at pH 7 and vanishingly small permeability through anion exchange membranes. Use of an electrochemical desalination hybrid flow battery is further discussed below.

Figure 10:
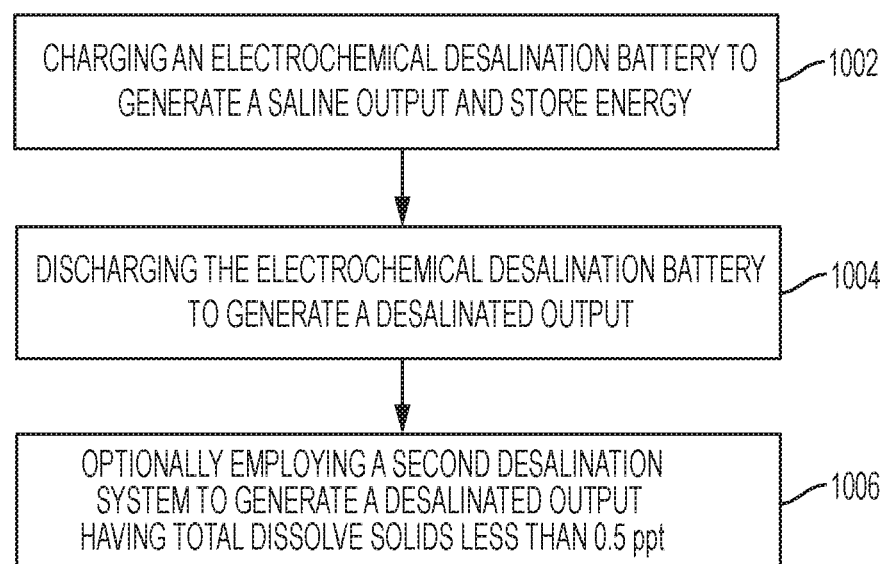
FIG. 10 is a flow diagram of a method in accordance with certain embodiments.

FIG. 10 illustrates an example method for using an electrochemical hybrid desalination flow battery, as described above, in an energy storage system. More specifically, the device operates as a hybrid desalination flow battery to store electricity and desalinate water in an alternating cycle. Since the cycles alternate, either the charge cycle or the discharge cycle could be considered "first." In the example of FIG. 10, an electrochemical desalination battery is charged to generate a saline output and store energy 1002 in a first half-cycle. In the second half-cycle, the electrochemical battery is discharged to generate a desalinated output 1004. In certain embodiments, the energy used to perform the discharge cycle may come from a renewable resource such as solar or wind power. An optional, further operation can include employing a second desalination process, other than an electrochemical hybrid desalination battery, to generate a further desalinated output 1006. For example, the output may be potable water (e.g., water having TDS equal to or less than 0.5 ppt). The second desalination system could be any of the above-described desalination systems other than an electrochemical battery, such as a brackish water reverse osmosis, capacitive deionization, or a thermal process.

The method of FIG. 10 is further described below. In a discharge half-cycle, an electrochemical desalination battery unit is provided. The battery unit comprises at least one water reservoir comprising an input and an output, wherein salinity of the water in the reservoir is reduced to about two parts per thousand during operation of the system. At least one negative-ion redox electrode comprises a first solution of a first electrolyte material and is configured to accept, and have, a reversible redox reaction with at least one negative ion in the water, and at least one positive-ion redox electrode comprising a second solution of a second electrolyte material and configured to accept, and have, a reversible redox reaction with at least one positive ion in the water. The battery unit further comprises a cation-exchange membrane disposed between the at least one negative-ion redox electrode and the water reservoir, and an anion-exchange membrane disposed between the at least one positive-ion redox electrode and the water reservoir. The discharge cycle includes transporting water having a first salinity into the water reservoir and discharging the battery unit to provide water having a second salinity that is lower than the first salinity. The water having the second salinity is then removed from the battery unit. As discussed above, the method can further include transporting the water having the second salinity into a second desalination system and desalinating the water to provide water having a third salinity that is lower than the second salinity. The third salinity can be potable water having a salinity of, for example, equal to or less than 0.5 parts per thousand.

A charge half-cycle mode of operation can provide a salinated water output. For example, in response to removing the water having the second salinity, water having a fourth salinity is transported into the water reservoir. Then the battery unit is charged to provide water having a fifth salinity that is higher than the fourth salinity. In certain embodiments, the fourth salinity is equal to about the first salinity (e.g., seawater).

Since the desalination battery is capable of both energy storage and desalination, and the process for desalination is coupled to energy storage, the charging, discharging, and/or idling of the battery can be performed at different rates and durations. This variation can increase, or maximize, the amount of electrical energy stored and delivered, the salination and/or desalination water flux, and/or the total system revenue. This versatility in utilization is not achievable with systems that are only capable of one of desalination and energy storage.

Figure 1B:
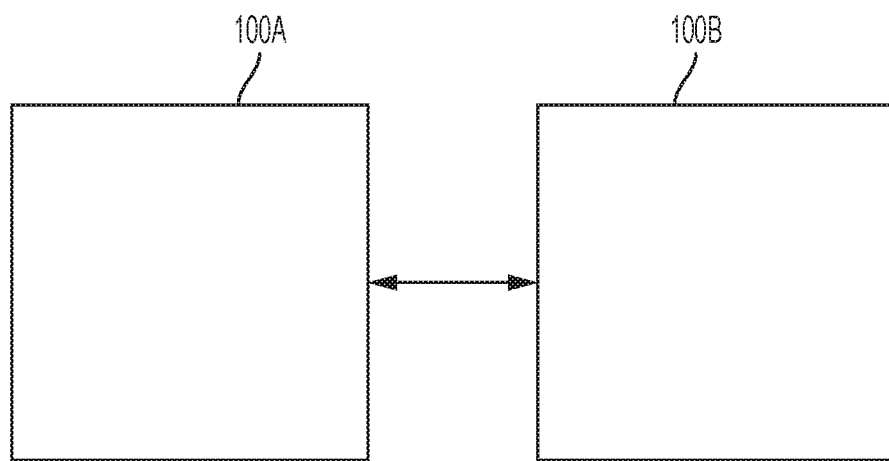
FIG. 1B illustrates an array of energy storage systems as shown in FIG. 1A in accordance with certain embodiments.

Further, an array of desalination batteries as described above can be operated such that all are in the same mode (salination or desalination) at the same time for improved load shifting. In other embodiments, the array can be divided into 50% in salination mode and 50% in desalination mode in order to reduce the power draw to the overall plant. However, in other embodiments, the array of batteries could be run in modes of any ratio in between these two examples in order to tune the energy storage/power draw ratio as a function of global grid demand. An array of batteries as shown in FIG. 1B can comprise at least two battery units, for example, a first battery unit 100A and a second battery unit 100B, and any number of batteries beyond two including an odd number of batteries.

In certain embodiments, the hybrid desalination battery may be used to desalinate seawater or brines from saline aquifers. In other embodiments, the battery may be used to desalinate a large variety of industrial waste streams or geothermal brines, which can be at different pH values and/or contain various amounts of non-aqueous solvents. In further embodiments, the battery can be used to selectively remove/add ions to the central electrolyte while preserving one or more properties of the central electrolyte such as pH, total suspended solids, and electrical conductivity. As described above in more detail, the hybrid desalination battery structure comprises at least three chambers separated by two ion exchange membranes (e.g., one cation exchange membrane and one anion exchange membrane). Notably, the hybrid desalination battery may be operated at a pH similar to that of the incoming feed (e.g., sea/salt water), to reduce or minimize a need for pH adjustment. Also, as discussed above, in other embodiments, one chamber (e.g., the anolyte) may have a slightly lower pH than the other chambers.

As discussed above, an electrochemical redox desalination battery can incorporate charge storage and desalination capacity into one device and/or system. The hybrid desalination battery is uniquely suited for desalinating hypersaline brines, which cannot be treated with traditional SWRO systems. The cell potential (+1.25 V) of the described battery is 0.9 V higher than other reported desalination batteries, and the specific capacity (cathode: 81 mAh g$^{-1}$, anode: 828 mAh g$^{-1}$) is at least two times higher than any other desalination battery reported to date. This allows the cost of desalination to be offset by revenue streams and cost savings traditionally associated with energy storage technologies. With further reduction in cell impedance, it may be possible to provide lower-cost seawater desalination through process intensification with electrical storage. More broadly, the above-discussed devices and processes raise a new paradigm of thinking about the economics of energy storage. Previously, the field has focused on minimizing the cost per kilowatt-hour, and such an approach has been reinforced by various cost models published to date. However, it may be equally viable to develop an energy storage solution that is economical by raising revenues rather than merely by cutting costs.

These concepts are further discussed below where the reversible desalination flow battery is compared with an alternative desalination process (SWRO) to evaluate the performance of the zinc-ferricyanide system. In a first-order macroscopic model, the battery utilizes anion- and cation-exchange membranes (total membrane ASR 2.3 $\Omega$cm$^2$), as well as bipolar plate current collectors. The anolyte, catholyte and water channels are cut out of silicone gaskets (500 μm thick). The geometric surface area is enhanced by filling the anolyte and catholyte channels with high-surface area electrodes (carbon paper or felt). Zinc chloride (0.3 M) and potassium ferricyanide (0.6 M) are used as the anolyte and catholyte, respectively. The flow battery module is assumed to comprise a 10.8 kWh stack (50 cells×2000 cm$^2$ cell area). The system is charged and discharged at a current density of 20 mA cm$^{-2}$ (7.47 mol m$^{-2}$ s$^{-1}$) and operates on a five-hour cycle. Table 1 below provides the input parameters for the electrochemical model used to simulate the reversible battery.

TABLE 1

| Desalination Battery System Parameters | |
|---|---|
| Flow Capacity | 250 gal |
| Temperature | 250° C. |
| Processing Time | 5 hours |
| NaCl Processed (Total) | 331 kg day$^{-1}$ |
| Power | 2.159878 kW |
| Areal Footprint (System) | 14,694.246 m$^2$ |
| No. of Stacks | 50 |
| Electrode Area | 2,025 cm$^2$ |
| Desalination Battery Technical Parameters | |
| Electrolyte Velocity | 10 cm s$^{-1}$ |
| Limiting Current (Cathode) | 89 mA cm$^{-2}$ |
| Limiting Current (Anode) | 105 mA cm$^{-2}$ |
| Viscosity | 0.001 Pa · s |
| Pumping Head/Electrolyte | 1286.408 Pa |
| Total Pump Power | 0.0136647 kW |
| Specific Pumping Energy | 0.11 kWh m$^{-3}$ |
| Specific Energy Consumption | 2.83 kWh m$^{-3}$ |
| Desalination Battery Parameters | |
| Battery Output | 10.80 kWh |
| Round-trip Efficiency | 81% |
| Ecell (nominal) | 1.25 V |
| Current Density | 20 mA cm$^{-2}$ |
| Chamber Thickness | 0.05 cm |
| Electrode Separation | 0.15 cm |
| Initial NaCl Content | 35,000 ppm |
| Final NaCl Content | 10,500 ppm |
| Membrane ASR | 2.3 $\Omega$ cm$^2$ |
| Seawater Conductivity | 60 mS cm$^{-1}$ |
| AEM ASR | 1 $\Omega$ cm$^2$ |
| CEM ASR | 1.3 $\Omega$ cm$^2$ |
| Equivalent Diameter | 0.10 cm |
| Sherwood Number | 12.6 |
| DoD | 0.7 |
| C-rate | 0.2 C |
| Cycle Life | 5110 cycles |

The energy losses within the flow battery are assumed to be purely ohmic. The overall battery resistance is assumed to change as a function of the battery state of charge, and is obtained by a simple sum of the resistances of the anolyte, catholyte, water chamber, and the ion-exchange membrane resistances. The ASR for the membrane is assumed to not change as a function of battery state of charge. During charging, the anolyte and catholyte conductivity increases at the expense of a drop in water salinity. The overall cell impedance is represented as below:

$$ASR_{total} = ASR_{AEM} + ASR_{CEM} + \frac{L}{\frac{1}{K_a} + \frac{1}{K_c} + \frac{1}{K_w}}$$

Changes to the anion and cation conductivity are simulated by simple addition or abstraction of the ions present in each chamber. Pumping losses are modeled assuming a channel flow geometry at a flow velocity of 10 cm $5^{-1}$, corresponding to an energy consumption of 0.11 Wh $L^{-1}$ in an optimized system. The pumping efficiency is assumed to be 75%.

As mentioned above, the reversible desalination flow battery is compared with a SWRO system. The energy consumption and flux of the SWRO system is modeled using Desalination Economic Evaluation Program (DEEP v5.1.1). Both systems were operated at a fixed water ratio of WR=0.50 and operated at a temperature of 25° C. to produce desalinated brackish water (TDS<10 ppt). The maximum transmembrane pressure was assumed to be 69 bar, corresponding to a design flux of 12.5 L $m^{-2}$ $h^{-1}$, which is the same as the equivalent flux of a desalination battery operating at 20 mA $cm^{-2}$. The second-step desalination to produce potable water was achieved with a brackish water reverse osmosis (BWRO) unit, with a fixed energy consumption of 1.36 Wh $L^{-1}$. The input parameters for the Desalination Economic Evaluation Program software used to model the seawater reverse osmosis process are provided below in Table 2.

TABLE 2

| Desalination Plant Specifications | |
| --- | --- |
| Total Desalination Plant Capacity (Wdrc) | 0 m³/d |
| Total Dissolved Solids (TDS) | 35,000 ppm |
| Thermal/RO ratio (ThRo) | 0% |
| Reverse Osmosis Case Specifications | |
| RO plant Capacity (Wro) | 100,000 m³/d |
| Feed Water Inlet Temp. at RO Element (Tim) | 25° C. |
| Energy Recovery Type (EerType) | PX |
| Reverse Osmosis Model | |
| Recovery Ratio (Rr) | 50% |
| Seawater Flow (Wfm) | 240,000 m³/day |
| Reject Brine Flow (Wbm) | 140,000 m³/day |
| Seawater Flow (Fsms) | 2778 kg · s |
| Outlet Dissolved Solids Concentration (dso) | 60,000 ppm |
| Product Water Quality (dspms) | 242.74 ppm |
| Temperature Correction Factor (kmTCF) | 1 |
| Salinity Correction Factor (kmSCF) | 0.7875 |
| Membrane Area Factor (Fma) | 0.73 |
| Pretreatment, Pump, Piping Size Increase Factor (Fpp) | 0.99 |
| Design Net Driving Pressure (NDP) | 21.9 bar |

TABLE 2-continued

| | |
| --- | --- |
| Approximate Inlet Osmotic Pressure (Pio) | 24.69 bar |
| Approximate Outlet Osmotic Pressure (Poo) | 42.33 bar |
| Average Osmotic Pressure (Pavg) | 35.19 bar |
| High Head Pump Pressure Rise (Dphm) | 60.08 bar |
| High Head Pump Power (Qhp) | 21.80 MW |
| Seawater Pumping Power (Qsp) | 0.60 MW |
| Booster Pump Power (Qbp) | 1.16 MW |
| Energy Recover (Qer) | −12.08 MW |
| Total Power Use (Qms) | 11.48 MW |
| Specific Power Use (Qcms) | 2.8 kWh/m³ |
| Reverse Osmosis Technical Parameters | |
| Maximum Design Pressure of the Membrane (Pmax) | 69 bar |
| Constant Used for Recovery Ratio (Ccalc) | 0.00115 |
| Design Average Permeate Flux (Dflux) | 13.6 l/m²h |
| Nominal Permeate Flux (Nflux) | 27.8 l/m²h |
| Polyamide Membrane Permeability Constant (A) | 3500 |
| Nominal Net Driving Pressure (NDPn) | 28.2 bar |
| Fouling Factor (kmFF) | 0.8 |
| Aggregation of Individual Ions Correction factor (kmAiiCF) | 1.05 |
| Specific Gravity of Seawater Feed Correction Factor (kmSGW) | 1.02 |
| Specific Gravity of Concentrate Correction Factor (kmSGC) | 1.04 |
| Pressure Drop Across the System (DPspd) | 2 bar |
| Permeate Pressure Losses (DPpp) | 1 bar |
| Pump Suction Pressure (DPps) | 1 bar |
| Concentrate Discharge Pressure (DPcd) | 0.5 bar |
| Seawater Pump Head (DPsm) | 1.7 bar |
| Booster Pump Head (DPbm) | 3.3 bar |
| High Head Pump Efficiency (Ehm) | 85% |
| Hydraulic Pump Hydraulic Coupling Efficiency (Ehhm) | 97% |
| Seawater Pump Efficiency (Esm) | 85% |
| Booster Pump Efficiency (Ebm) | 85% |
| Energy Recovery Efficiency (Eer) | 95% |

In addition to comparing desalination systems, the reversible desalination flow battery is compared with other redox desalination batteries. The technical performance metrics for the zinc-ferricyanide hybrid desalination battery (Zn|K$_3$[Fe(CN)$_6$]) are compared to other similar, rechargeable desalination battery systems reported in literature and are summarized in Table 3 below.

TABLE 3

| System | Sp. capacity (mAh g$^{-1}$) | $E_{cell}^0$ (V) | Salinity (ppt) | Salt removal (%) | SEC (Wh L$^{-1}$) | Cycles | j (mA cm$^{-2}$) |
|---|---|---|---|---|---|---|---|
| Zn\|K$_3$[Fe(CN)$_6$] | 820 (anode) 81.4 (cathode) | 1.25 | 35-100 | 86% | 2.11 | 7 | 0.13-6.25 |
| Ag\|λ-MnO$_2$ | 249 (anode) 35 (cathode) | 0.30 | 35.06 | 25% | 0.29 | 1 | 0.5 |
| Ni$_x$[Fe(CN)$_6$]$_y$\| Fe$_x$[Fe(CN)$_6$]$_y$ | 27.5 | 0.25-0.45 | 29.22 | 40% | 0.34 | 100 | 0.5 |

It should be noted that the first desalination battery was operated on the entropic difference between fresh and saline water, and consequently, was not a rechargeable design. For the sake of an accurate comparison, this discussion is limited to the Ag/|MnO$_2$ battery (line two of Table 3) and the "rocking chair" desalination battery (line three of Table 3).

The Ag|MnO$_2$ battery operates by sequestering the ions into solid anodic (Ag+Cl$^-$→AgCl+e$^-$) and cathodic species (MnO$_2$+xNa$^+$+e$^-$→Na$_x$MnO$_2$). Although effective as a membrane-less design, the key drawbacks are the particularly expensive silver anode (~$500 kg$^{-1}$) and low nominal cell potential (0.30 V). When operated in desalination mode, the interaction system was able to achieve up to 25% salt removal from seawater. However, the cathodic reaction achieves low selectivity for the intercalation of alkali metal ions. The Ag|MnO$_2$ system achieves a maximal coulombic efficiency of 57% for Na$^+$ intercalation, while the coulombic efficiency of Na$^+$ intercalation in the "rocking chair" system is only 39.9%. Although the K$^+$ intercalation is reportedly high, it is unclear whether this effect would be sustained at higher concentrations. The proton intercalation reaction likely has favorable intercalation kinetics due to the smaller ionic radius of the H$^+$ ion, and is the likely cause for the inefficiency. This is consistent with the data indicating that O$_2$ evolution and OH$^-$ formation are responsible for the coulombic inefficiencies.

In contrast, the high cell potential of the low cost Zn anode (−0.76 V vs SHE) enables a high nominal cell potential of 1.25 V, approximately 0.9 V higher than the other systems. The use of low cost materials with high specific capacity results in a significant reduction in cost per energy capacity. The use of liquid catholyte ensures that the experimental specific capacity of the ferri/ferrcyanide reaction (81.4 mAh g$^{-1}$) is much closer to the theoretical value, a substantial improvement over the "rocking chair battery" (27.5 mAh g$^{-1}$). The extent of desalination (86%) and input water salinity (100 g L$^{-1}$ NaCl) are the highest values reported to date.

Figure 11A:
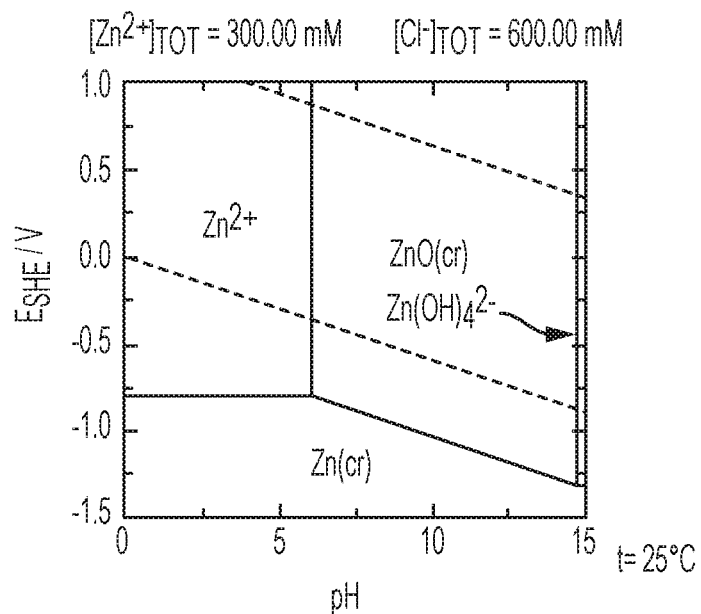
FIG. 11A is a Pourbaix diagram for Zn|$ZnCl_2$ (0.3 M) in accordance with certain embodiments.
Figure 11B:
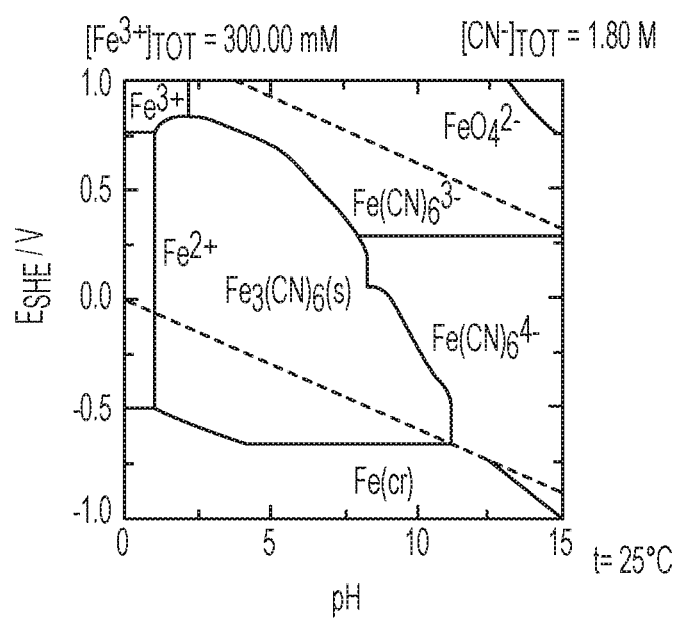
FIG. 11B is a Pourbaix diagram for $K_3[Fe(CN)_6]$ (0.3 M)+$K_4[Fe(CN)_6]$ (0.3 M) in accordance with certain embodiments.

Turning to FIGS. 11A-B, the electrochemical and thermodynamic stability of the zinc-ferricyanide system is assessed using $E_h$-pH (Pourbaix) diagrams. Both diagrams were constructed using Medusa software (KTH). The species concentrations were adjusted to mimic the battery operating conditions.

FIG. 11A is the Pourbaix diagram for Zn|ZnCl$_2$ (0.3 M). The diagram indicates that the desalination battery is chemically stable at pH<5.90, above which system performance deteriorates on account of the formation of a corrosion-resistant ZnO layer. Maintaining the anolyte at this potential prevents loss of battery capacity. Hydrogen evolution during battery charging is thermodynamically favored and typically occurs as a parasitic reaction. However, hydrogen evolution on Zn is associated with a high activation overpotential ($\eta_{act}$~0.8 V)[5], and the hydrogen evolution current is typically negligible.

FIG. 11B is the Pourbaix diagram for K$_3$[Fe(CN)$_6$] (0.3 M)+K$_4$[Fe(CN)$_6$] (0.3 M). Potassium ferricyanide deteriorates under ultraviolet light; therefore, solutions should be maintained in a dark environment. The diagram indicates that the system is otherwise stable within a pH range of 8-15. Reducing the pH below 8 leads to precipitation of the ferricyanide salt. Fortuitously, the ferricyanide solubility improves with temperature and pH, and precipitation may be avoided by base addition or operation at an elevated temperature. Also, reducing the catholyte pH below 1 can be detrimental to the battery, since it results in the likely evolution of toxic HCN gas. As long as the ZnCl$_2$ anolyte is maintained at pH>3, the likelihood of HCN evolution can be avoided, even in the event of catastrophic membrane failure.

Figure 12A:
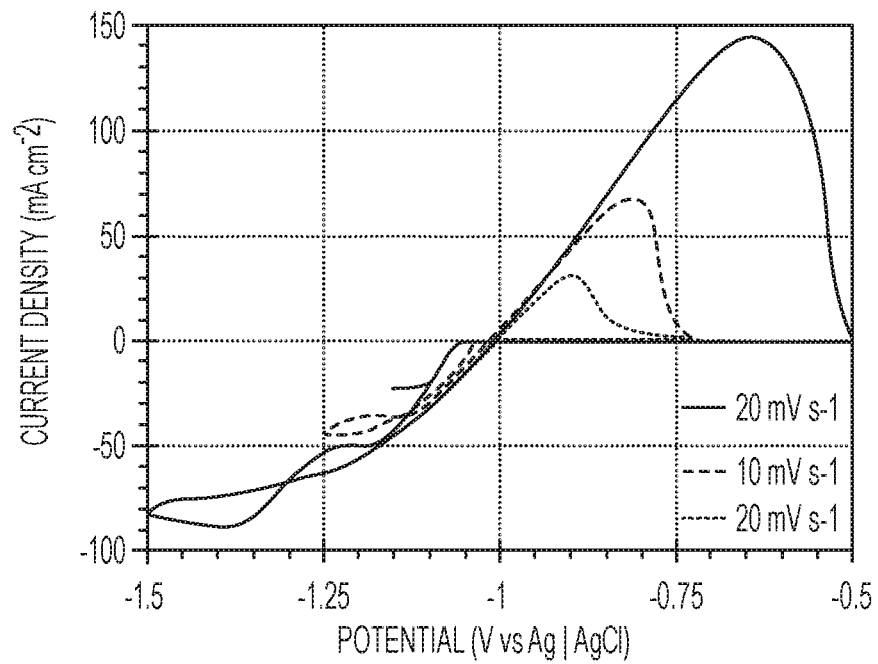
FIG. 12A is a cyclic voltammogram for a glassy carbon electrode immersed in 0.25 M $ZnCl_2$ in accordance with certain embodiments.
Figure 12B:
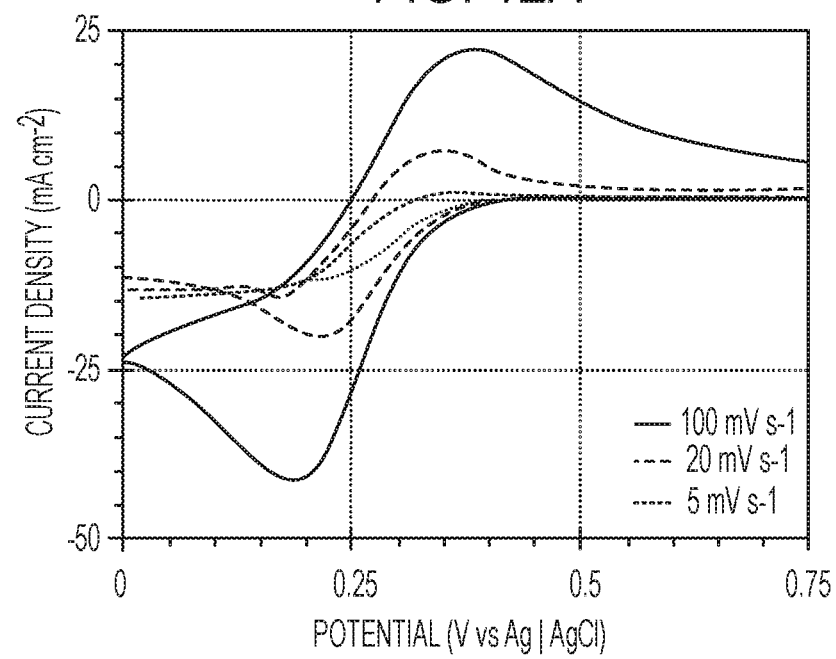
FIG. 12B is a cyclic voltammogram for a glassy carbon electrode immersed in 0.25 M $K_3[Fe(CN)_6]$ in accordance with certain embodiments.

Turning to FIGS. 12A-B, the current formed by the respective electrodes of the zinc-ferricyanide system is assessed using cyclic voltammetry. FIG. 12A is a cyclic voltammogram recorded for a glassy carbon electrode immersed in 0.25 M ZnCl$_2$, and FIG. 12B is a cyclic voltammogram recorded for a glassy carbon electrode immersed in 0.25 M K$_3$[Fe(CN)$_6$]. The cyclic voltammograms were recorded in a non-flowing beaker setup containing 30 mL of anolyte (0.25 M ZnCl$_2$+1 M NaCl) and catholyte (0.25 M K$_4$[Fe(CN)$_6$]+1 M NaCl) respectively. The electrochemical cell used a Pt wire counter electrode and Ag|AgCl reference electrode. The working electrode was a PTFE-shrouded glassy carbon disk (0.6 cm diameter) which was polished to a mirror finish using 0.3 μm alumina prior to each experiment.

FIG. 12A indicates that the onset of Zn deposition begins around −1 V (vs. Ag|AgCl). Hydrogen evolution is observed beyond the mass-transfer limiting current for zinc reduction. The dissolution peak is substantially higher, indicating that the dissolution kinetics are more facile than deposition. This could be attributed to the greater chloride concentration (1.6 M) and also partially to the higher diffusion coefficient of the chloride ion. The anodic current drops sharply after the peak, indicating the formation of a protective ZnO layer that prevents further Zn dissolution. The redox peaks become increasingly sluggish at higher scan rates, as evidenced by the substantial peak shift at 20 mV s$^{-1}$. The 1 e$^-$ ferricyanide reduction has a lower peak current than 2 e$^-$ Zn reduction at the same scan rate (20 mV s$^{-1}$). Additionally, the reduction and oxidation current is comparable in magnitude, indicating reversible kinetics.

Figure 13A:
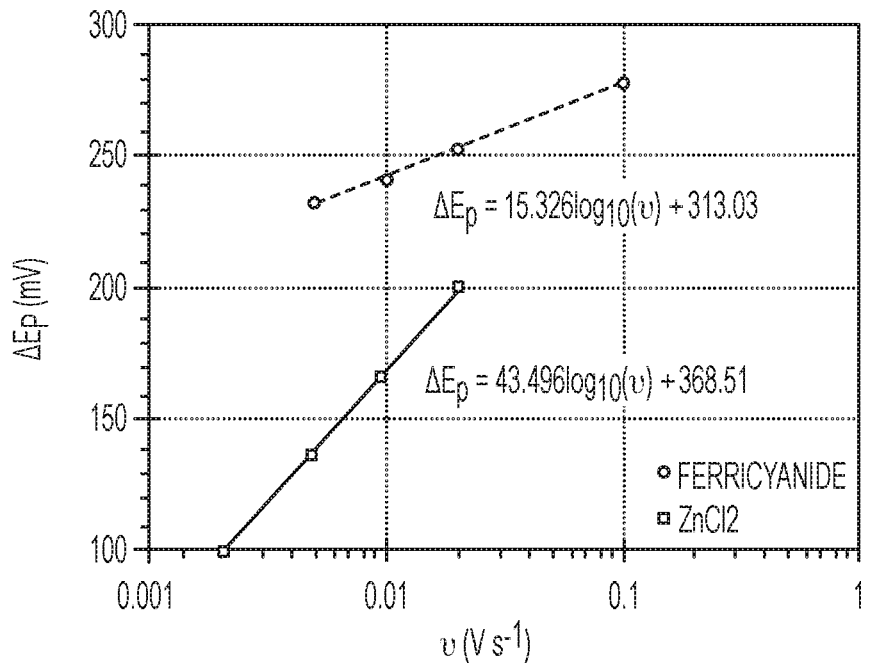
FIG. 13A is a plot of peak separation as a function of scan rate in accordance with certain embodiments.
Figure 13B:
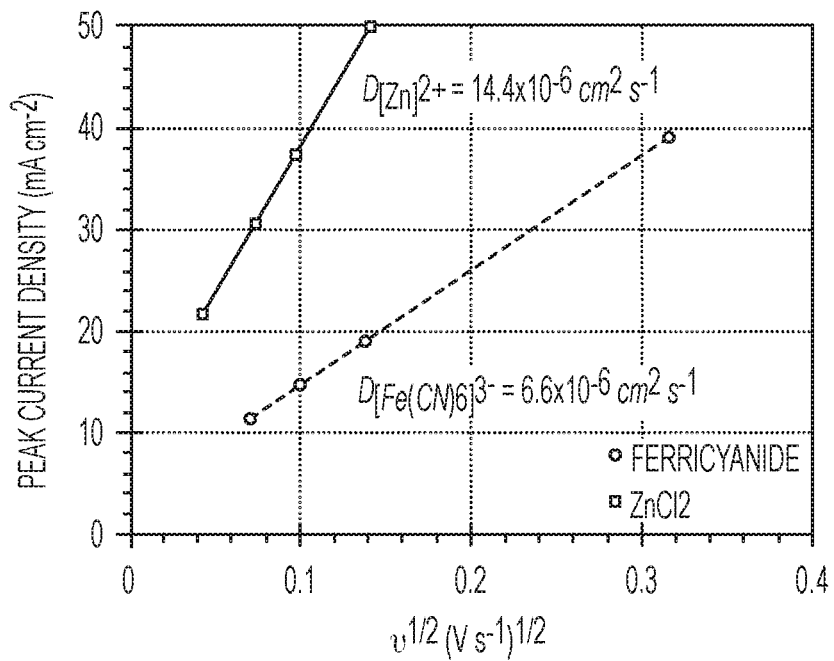
FIG. 13B is a plot of cathodic peak current density as a function of scan rate in accordance with certain embodiments.

The reaction kinetics and mass transport of the zinc-ferricyanide system are further assessed. The cyclic voltammetry data of FIGS. 12A-B was used to evaluate the diffusion coefficients of Zn$^{2+}$ and [Fe(CN)$_6$]$^3$ using the Randles-Sevcik equation for quasi-reversible systems. The peak separation and peak current density for zinc and ferricyanide reduction were computed from the above cyclic voltammogram data. FIG. 13A shows the peak separation plotted as a function of the scan rate, and FIG. 13B shows the cathodic peak current density plotted as a function of the scan rate.

Cyclic voltammograms recorded at increasing scan rates cause the peak potential to shift in a more negative direction. The magnitude of the peak separation is related to the reaction coefficient ($k_0$), charge transfer coefficient ($\alpha$), scan rate ($\upsilon$), and diffusion coefficient (D) by the following equation:

$$\Delta E_p = \frac{RT}{\alpha F}\left[0.780 + \ln\left(\frac{D^{1/2}}{k_0}\right) + \ln\left(\frac{\alpha n_a F v}{RT}\right)^{1/2}\right]$$

The diffusion coefficient (at 25° C.) was determined from the peak current ($j_p$) by solving the equation:

$$j_p = (2.99 \times 10^5) n (\alpha n_a)^{1/2} C D^{1/2}$$

The charge transfer coefficient was calculated from the slope for the 1 e⁻ ferricyanide and 2 e⁻ zinc reduction, respectively, from FIG. 13A. This value was substituted in the expression for the peak current to determine the diffusion coefficient. Ultimately, the reaction kinetics coefficient was calculated from the intercept on the plot of $E_p$ versus scan rate. The values for the kinetic, charge transfer, and diffusion coefficients of zinc and ferricyanide reduction are summarized in Table 4 below.

TABLE 4

| Species | D ($\times 10^{-6}$ cm² s⁻¹) | $\alpha$ | $k_0$ ($\times 10^{-3}$ cm s⁻¹) | $D_{lit}$ ($\times 10^{-6}$ cm² s⁻¹) |
|---|---|---|---|---|
| $Zn^{2+}$ | 14.4 | 0.128 | 0.66 | 11[7] |
| $[Fe(CN)_6]^{3-}$ | 6.55 | 0.363 | 0.25 | 6.67[8] |

As can be seen, the zinc electrode enjoys rapid mass transfer on account of the faster diffusivity of the $Zn^{2+}$ ion. Zinc reduction in the system is primarily impeded by the sluggishness of the charge transfer reaction. The ferricyanide system has much faster kinetics, as indicated by its higher charge transfer coefficient ($\alpha$=0.363). However, the kinetic coefficient is 2.6 times lower than that of the zinc electrode. Electrolyte and electrode additives may improve these system parameters.

Figure 14A:
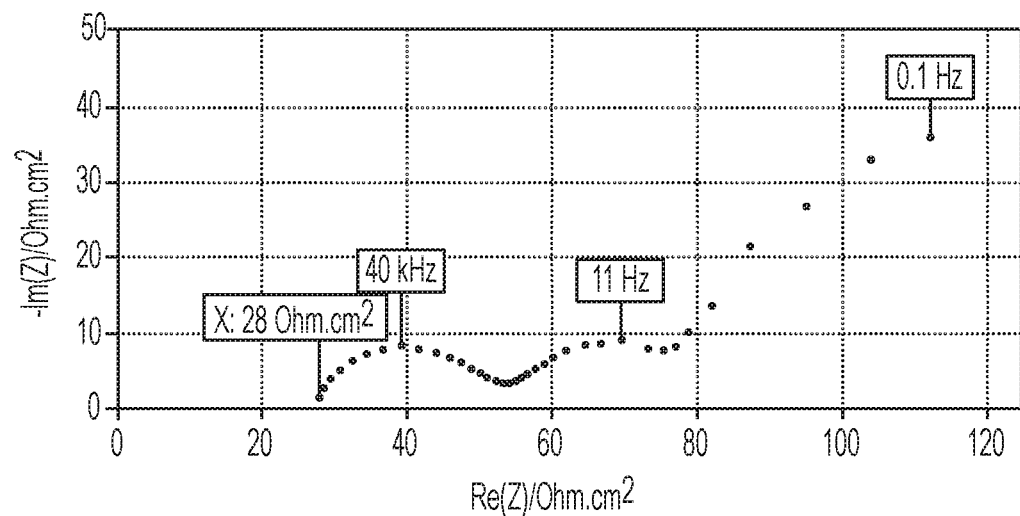
FIG. 14A is the high-frequency electrochemical impedance spectroscopy response of a desalination battery having a water reservoir thickness of 10 mm in accordance with certain embodiments.
Figure 14B:
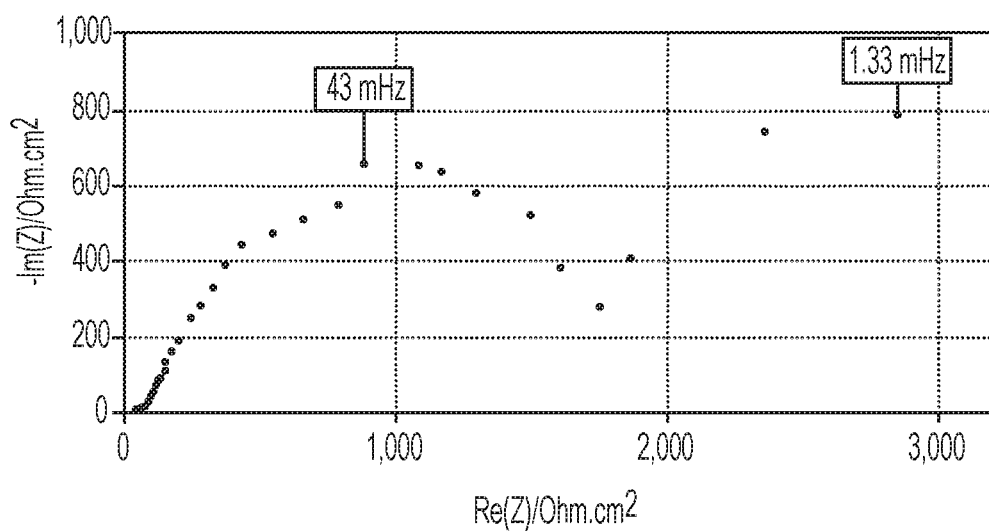
FIG. 14B is the low-frequency electrochemical impedance spectroscopy response of a desalination battery having a water reservoir thickness of 10 mm in accordance with certain embodiments.
Figure 15:
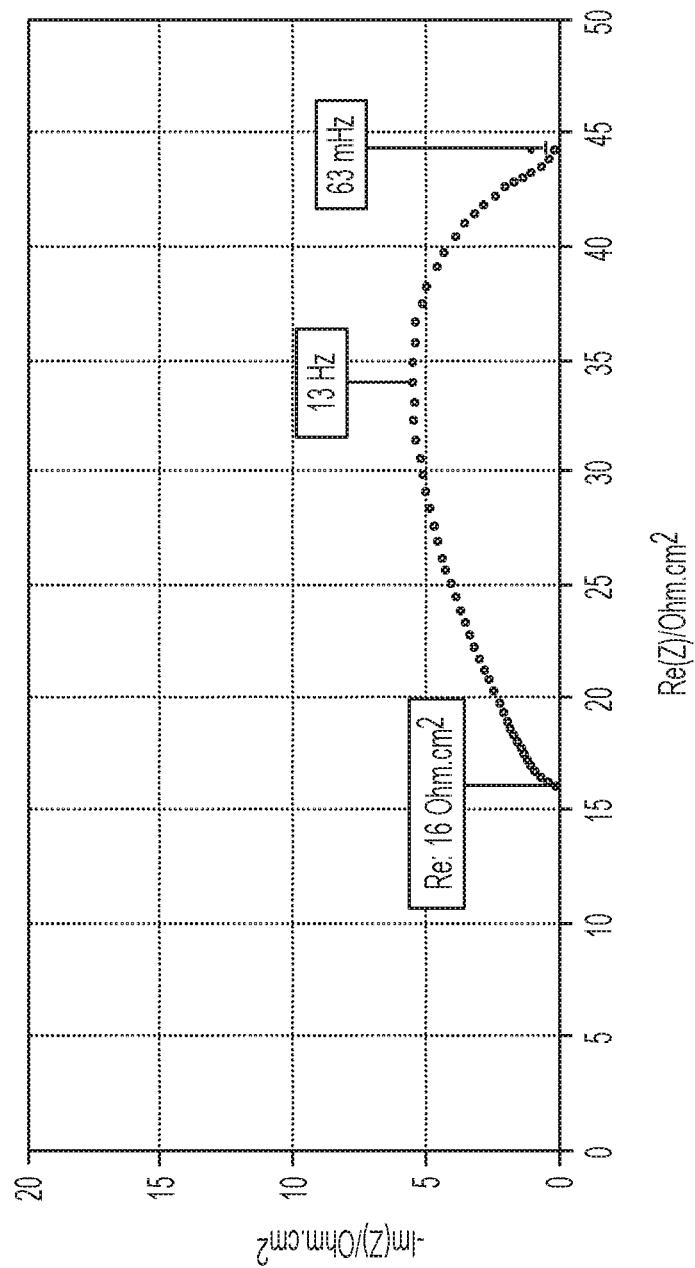
FIG. 15 is the electrochemical impedance spectroscopy response of a desalination battery having a water reservoir thickness of 0.8 mm in accordance with certain embodiments.

In FIGS. 14A-B and 15, electrochemical impedance spectroscopy (EIS) is used to elucidate the timescales and relative magnitudes of the processes occurring in the zinc-ferricyanide desalination battery. The electrochemical response was analyzed using the impedance analyzer on a Bio-logic VSP-300 potentiostat. The potential was oscillated over the frequency range 2 MHz to 1 mHz with an amplitude of 10 mV about the open circuit value.

A cell having a 10 mm thick water reservoir ("thick cell") desalination battery was assembled with a stagnant water reservoir. The EIS response of the thick cell at high frequencies is shown in FIG. 14A, and the EIS response of the thick cell at low frequencies is shown in FIG. 14B. The EIS response at low frequencies is controlled by the timescale of the mass-transfer limiting processes occurring within the cell. The high-frequency response comprises of a solution resistance (28.5 $\Omega$cm²), of which the NaCl resistance in the water chamber is the primary contributor (19 $\Omega$cm²). Two capacitive loops are observed, and correspond to the charging of the double layers and charge-transfer processes (40 kHz and 10 Hz) occurring at each electrode. The cyclic voltammetry data supports the hypothesis of the faster process being associated with the ferricyanide charge-transfer and the slower process associated with zinc reduction. The low-frequency response was composed of two Warburg impedances (43 mHz and 1.33 mHz) associated with the relaxation of concentration gradients within the ion-exchange membranes and the water chamber.

A cell having a 0.8 mm thick water reservoir ("thin cell") was also assembled and the impedance response is shown in FIG. 15. The use of a flowing electrolyte in the central water chamber helps ameliorate much of the concentration gradients present in the thin cell, which reduces the low-frequency cell impedance by at least 20 times. The high-frequency response is controlled by the kinetics of zinc reduction, while the low-frequency impedance response is solely governed by ion diffusion across the membrane diffusion. The EIS response can also be used to determine the maximum steady state current delivered by the cell (1.25 V/44 $\Omega$cm²=29 mA cm²).

Figure 16A:
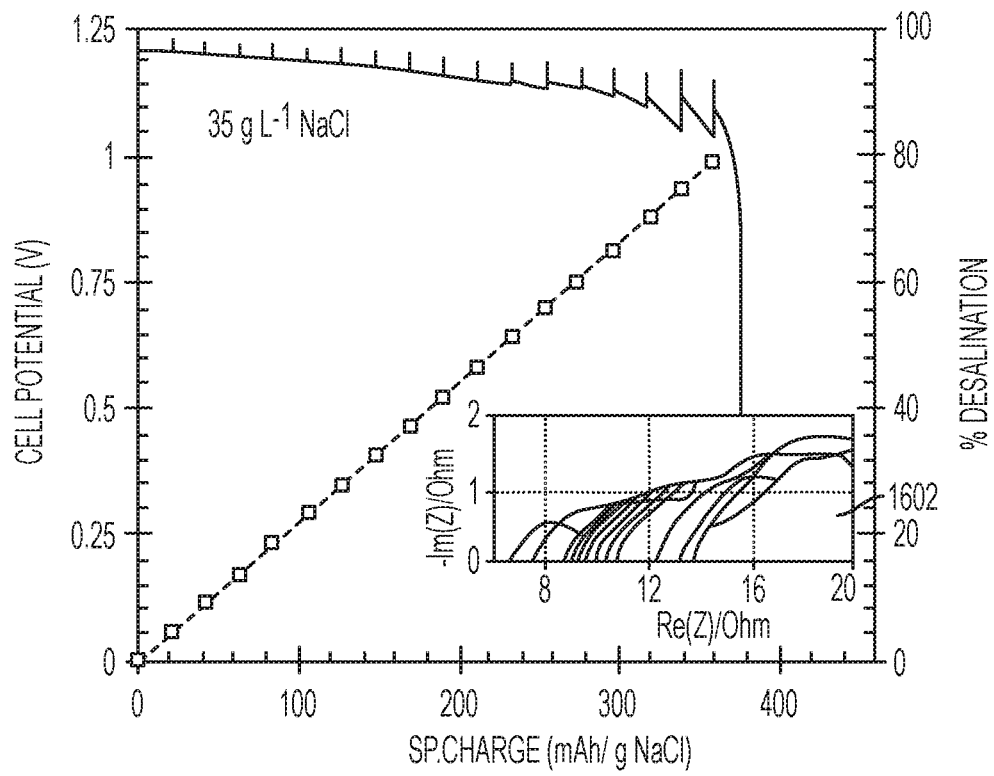
FIG. 16A shows in-situ measurement of water salinity in a desalination battery having a water reservoir thickness of 10 mm.
Figure 16B:
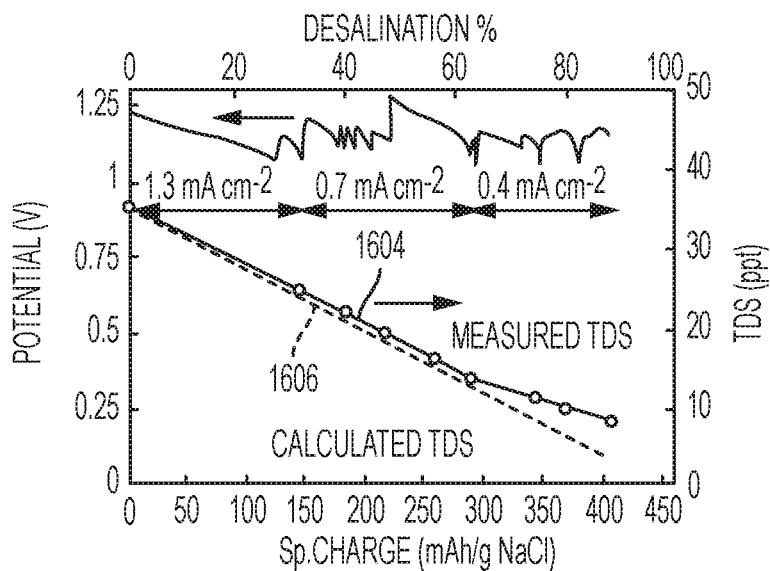
FIG. 16B shows ex-situ measurement of water salinity in a desalination battery having a water reservoir thickness of 10 mm.

Turning to FIGS. 16A-B, the zinc-ferricyanide desalination battery's water recovery ratio is assessed. Water crossover across the membranes on relaxation of the electric field is a potential source of inefficiency. FIG. 16A shows an in-situ measurement of water sailinity in a desalination battery having a 10 mm thick water reservoir, and FIG. 16B shows an ex-situ measurement of water salinity for the same cell using a conductivity meter. A galvanostatic intermittent titration technique (GITT) was used to validate stoichiometric salt removal from the water chamber in FIG. 16A. Similar to above, a 10 mm thick water reservoir was assembled, and discharged at 0.7 mA cm⁻². The discharge step was interrupted every hour, and a fast EIS scan 1602 was used to record the high-frequency impedance response. The salinity of the seawater chamber was elucidated using a resistances-in-series model and used to compute the instantaneous value of salinity. As indicated in FIGS. 16A-B, the amount of salt removed correlated with the amount of charge passed, indicating the absence of parasitic reactions.

However, the osmotic pressure between the catholyte and water chamber is observed to result in an effluent water flux, resulting in the partial loss of produced water. As shown in FIG. 16B, the measured TDS 1604 deviates from the predicted value 1606 indicating water crossover from the seawater chamber along with iron migration. This non-linear effect is more pronounced at higher extents of desalination. For example, approximately 10% of the water in the seawater chamber had crossed over by the time salt removal had risen above 80%. The detrimental effects of water crossover may be moderated by terminating the desalination step after 70% salt removal followed by rapidly emptying out the water chamber.

Under normal operation, the desalination battery can achieve a water recovery ratio of 0.45 (assuming 10% water losses). However, the recovery ratio can be substantially improved by concentrating seawater to create hypersaline brines. As discussed above, water can be concentrated from 35 g L⁻¹ NaCl to at least 100 g L⁻¹, which corresponds to an estimated water recovery ratio of 70%. This result is comparable with the theoretical maximum water ratio (95%) based on NaCl salinity. Thus, as indicated above, the above results suggest that a hybrid desalination flow battery can be implemented, especially in areas of the world where the salinity level is high and that rely on desalination for their fresh water needs. Further embodiments involve the battery being used in MLD wastewater treatment when operated as a brine concentrator.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description has been presented for the purposes of illustration and description. It is not intended to be exhaustive or to limit the embodiments to the precise form disclosed. Many modifications and variations are possible in light of the above teachings. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:

1. A reversible desalination and energy storage system, comprising:
   at least one water reservoir comprising an input and an output, wherein water in the at least one water reservoir is reduced below a threshold concentration during a desalination operation mode;
   at least one negative-ion redox electrode comprising a first solution of a first electrolyte material and configured to accept, and have a reversible redox reaction with, at least one negative ion in the water;
   at least one positive-ion redox electrode comprising a second solution of a second electrolyte material and configured to accept, and have a reversible redox reaction with, at least one positive ion in the water;
   a cation-exchange membrane disposed between the at least one negative-ion redox electrode and the water reservoir; and
   an anion-exchange membrane disposed between the at least one positive-ion redox electrode and the water reservoir.

2. The system of claim 1, wherein the system is configured to remove dissolved ionic species from the water in the at least one water reservoir having an electrolyte concentration of up to the solubility limit of the ionic species in the solution.

3. The system of claim 1, wherein the system is configured to add dissolved ionic species to the water in the at least one water reservoir to provide an electrolyte concentration in the water of up to the solubility limit of the ionic species in the water.

4. The system of claim 1, wherein the first solution, the second solution, and the water each has a pH between and including 3-10.

5. The system of claim 1, wherein the system is configured to operate alternately in a desalination mode and a salination mode, wherein the salination mode comprises driving ions from the at least one negative-ion redox electrode and the at least one positive-ion redox electrode into the at least one water reservoir while storing energy in the system, and the desalination mode comprises desalinating water while releasing stored energy as output power employing the at least one negative-ion redox electrode as a positive or negative output electrode and the at least one positive-ion redox electrode as a negative or positive output electrode.

6. The system of claim 1, wherein the system has a standard cell potential of at least 0.8 V.

7. The system of claim 1, wherein the input water comprises seawater, and the output is brackish water having salinity of about 5 parts per thousand.

8. The system of claim 1, further comprising a second desalination system coupled to the water reservoir output, wherein the second desalination system uses a water treatment process other than an electrochemical battery.

9. The system of claim 8, wherein the second desalination system uses reverse osmosis.

10. The system of claim 8, wherein the second desalination system is configured to output potable water.

11. An apparatus, comprising:
    a first system according to claim 1; and
    a second system according to claim 1.

12. The apparatus of claim 11, wherein the first system and the second system are configured to operate in a desalination mode and a salination mode, and the first and second system operate in the same mode at the same time.

13. The apparatus of claim 11, wherein the first system and the second system are configured to operate in a desalination mode and a salination mode, and the first and second systems operate in different modes at the same time.

14. A method, comprising:
    providing an electrochemical desalination battery unit comprising:
      at least one water reservoir comprising an input and an output, wherein water in the at least one water reservoir is reduced below a threshold concentration during a desalination operation mode;
      at least one negative-ion redox electrode comprising a first solution of a first electrolyte material and configured to accept, and have a reversible redox reaction with, at least one negative ion in the water;
      at least one positive-ion redox electrode comprising a second solution of a second electrolyte material and configured to accept, and have a reversible redox reaction with, at least one positive ion in the water;
      a cation-exchange membrane disposed between the at least one negative-ion redox electrode and the water reservoir; and
      an anion-exchange membrane disposed between the at least one positive-ion redox electrode and the water reservoir;
    transporting water having a first salinity into the water reservoir;
    discharging the battery unit to provide water having a second salinity that is lower than the first salinity; and
    removing the water having the second salinity from the battery unit.

15. The method of claim 14, further comprising:
    transporting the water having the second salinity into a second desalination system; and
    desalinating the water to provide water having a third salinity that is lower than the second salinity.

16. The method of claim 15, wherein the third salinity is equal to or less than 0.5 parts per thousand.

17. The method of claim 14, further comprising:
    in response to removing the water having the second salinity, transporting water having a fourth salinity into the water reservoir; and
    charging the battery unit to provide water having a fifth salinity that is higher than the fourth salinity.

18. The method of claim 17, wherein the fourth salinity is equal to about the first salinity.

19. A reversible desalination and energy storage system comprising:
- a central reservoir comprising a first electrolyte solution, an input and an output, wherein the first electrolyte solution has a first pH;
- at least one negative-ion redox electrode comprising a second electrolyte solution and configured to accept, and have a reversible redox reaction with, at least one negative ion in the first electrolyte solution, wherein the second electrolyte solution has a second pH;
- at least one positive-ion redox electrode comprising a third electrolyte solution and configured to accept, and have a reversible redox reaction with, at least one positive ion in the first electrolyte solution, wherein the third electrolyte solution has a third pH and the first, second, and third pH is between and including 3-10;
- a cation-exchange membrane disposed between the at least one negative-ion redox electrode and the central reservoir; and
- an anion-exchange membrane disposed between the at least one positive-ion redox electrode and the central reservoir.

20. The system of claim 19, wherein the system is configured to operate alternately in a desalination mode and a salination mode, wherein the salination mode comprises driving ions from the at least one negative-ion redox electrode and the at least one positive-ion redox electrode into the central reservoir while storing energy in the system, and the desalination mode comprises desalinating the first electrolyte solution while releasing stored energy as output power employing the at least one negative-ion redox electrode as a positive or negative output electrode and the at least one positive-ion redox electrode as a negative or positive output electrode.

* * * * *